(12) United States Patent
Bretz

(10) Patent No.: US 11,198,566 B2
(45) Date of Patent: Dec. 14, 2021

(54) METHOD AND DEVICE FOR TRANSFERRING CONVEYED ITEMS BETWEEN TWO CONVEYING APPLIANCES, AS WELL AS A CONVEYING SYSTEM

(71) Applicant: WRH Walter Reist Holding AG, Ermatingen (CH)

(72) Inventor: Markus Bretz, Herrliberg (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 0 days.

(21) Appl. No.: 16/641,848

(22) PCT Filed: Aug. 14, 2018

(86) PCT No.: PCT/EP2018/072007
§ 371 (c)(1),
(2) Date: Feb. 25, 2020

(87) PCT Pub. No.: WO2019/042761
PCT Pub. Date: Mar. 7, 2019

(65) Prior Publication Data
US 2021/0147162 A1    May 20, 2021

(30) Foreign Application Priority Data
Aug. 28, 2017    (CH) .................... 01070/17

(51) Int. Cl.
*B65G 47/96* (2006.01)
*B65G 17/00* (2006.01)
(Continued)

(52) U.S. Cl.
CPC ......... *B65G 47/965* (2013.01); *B65G 17/002* (2013.01); *B65G 17/24* (2013.01);
(Continued)

(58) Field of Classification Search
CPC .... B65G 47/962; B65G 47/965; B65G 17/24; B65G 47/96; B65G 47/53; B65G 11/023;
(Continued)

(56) References Cited

U.S. PATENT DOCUMENTS

| 2,108,522 | A | | 2/1938 | Bergmann |
| 3,169,631 | A | * | 2/1965 | Knappe ................ B65G 47/945 |
| | | | | 198/839 |

(Continued)

FOREIGN PATENT DOCUMENTS

| CH | 710608 | 7/2016 |
| DE | 4203799 | 8/1993 |

(Continued)

OTHER PUBLICATIONS

English translation of International Preliminary Report on Patentability dated Mar. 3, 2020, Application No. PCT/EP2018/072007; 9 pages.

(Continued)

*Primary Examiner* — James R Bidwell
(74) *Attorney, Agent, or Firm* — Rankin, Hill & Clark LLP

(57) ABSTRACT

A method for transferring conveyed items from at least one feed conveyor onto an outgoing conveyor, in a transfer region, wherein the at least one feed conveyor includes a conveying member that is driven along a feed conveying stretch, for conveying conveyed items into the transfer region, and the outgoing conveyor includes conveying containers that are movable along a transfer conveying stretch for taking over the conveyed items that are delivered by the at least one feed conveyor. The conveyed items that lie on the conveying member are accelerated relative to the conveying member along the feed conveying stretch towards the transfer region via an acceleration device and for the pur- (Continued)

pose of delivery of the conveyed items are brought into a cyclically synchronous side-by-side conveying with a conveying container of the outgoing conveyor.

27 Claims, 12 Drawing Sheets

(51) Int. Cl.
  *B65G 17/24* (2006.01)
  *B65G 47/53* (2006.01)
  *B65G 43/10* (2006.01)
(52) U.S. Cl.
  CPC .............. *B65G 47/53* (2013.01); *B65G 43/10* (2013.01); *B65G 2201/0258* (2013.01); *B65G 2203/0291* (2013.01); *B65G 2811/095* (2013.01)
(58) Field of Classification Search
  CPC .......... B65G 2201/0285; B65G 17/002; B65G 43/10
  USPC .................................... 198/370.04
  See application file for complete search history.

(56) References Cited

U.S. PATENT DOCUMENTS

| | | | |
|---|---|---|---|
| 3,693,776 A | 9/1972 | Harrison | |
| 4,461,378 A * | 7/1984 | Roth | B65G 17/02 198/370.04 |
| 5,161,665 A | 11/1992 | Cragun | |
| 5,353,912 A * | 10/1994 | Killer | B07C 3/082 198/370.04 |
| 5,632,589 A | 5/1997 | Bray et al. | |
| 6,571,937 B1 | 6/2003 | Costanzo et al. | |
| 7,766,151 B2 * | 8/2010 | Schaefer | B65G 1/1378 198/370.04 |
| 2003/0148724 A1 * | 8/2003 | Shefet | B65G 47/54 452/32 |
| 2004/0074738 A1 * | 4/2004 | Brixius | B65G 47/965 198/370.04 |
| 2004/0134751 A1 | 7/2004 | Beck et al. | |
| 2008/0121498 A1 | 5/2008 | Costanzo et al. | |
| 2010/0252398 A1 | 10/2010 | Fourney | |
| 2011/0277420 A1 | 11/2011 | Peters et al. | |

FOREIGN PATENT DOCUMENTS

| | | |
|---|---|---|
| EP | 1 120 369 | 8/2001 |
| EP | 1 388 510 | 2/2004 |
| EP | 1 719 721 | 11/2006 |
| EP | 2 135 825 | 12/2009 |
| EP | 3 176 111 | 6/2017 |
| JP | 53-128873 | 11/1978 |
| WO | 2013/075714 | 5/2013 |
| WO | 2017/076541 | 5/2017 |

OTHER PUBLICATIONS

Switzerland Search Report dated Aug. 12, 2017, Application No. 01070/17; 3 pages.

* cited by examiner

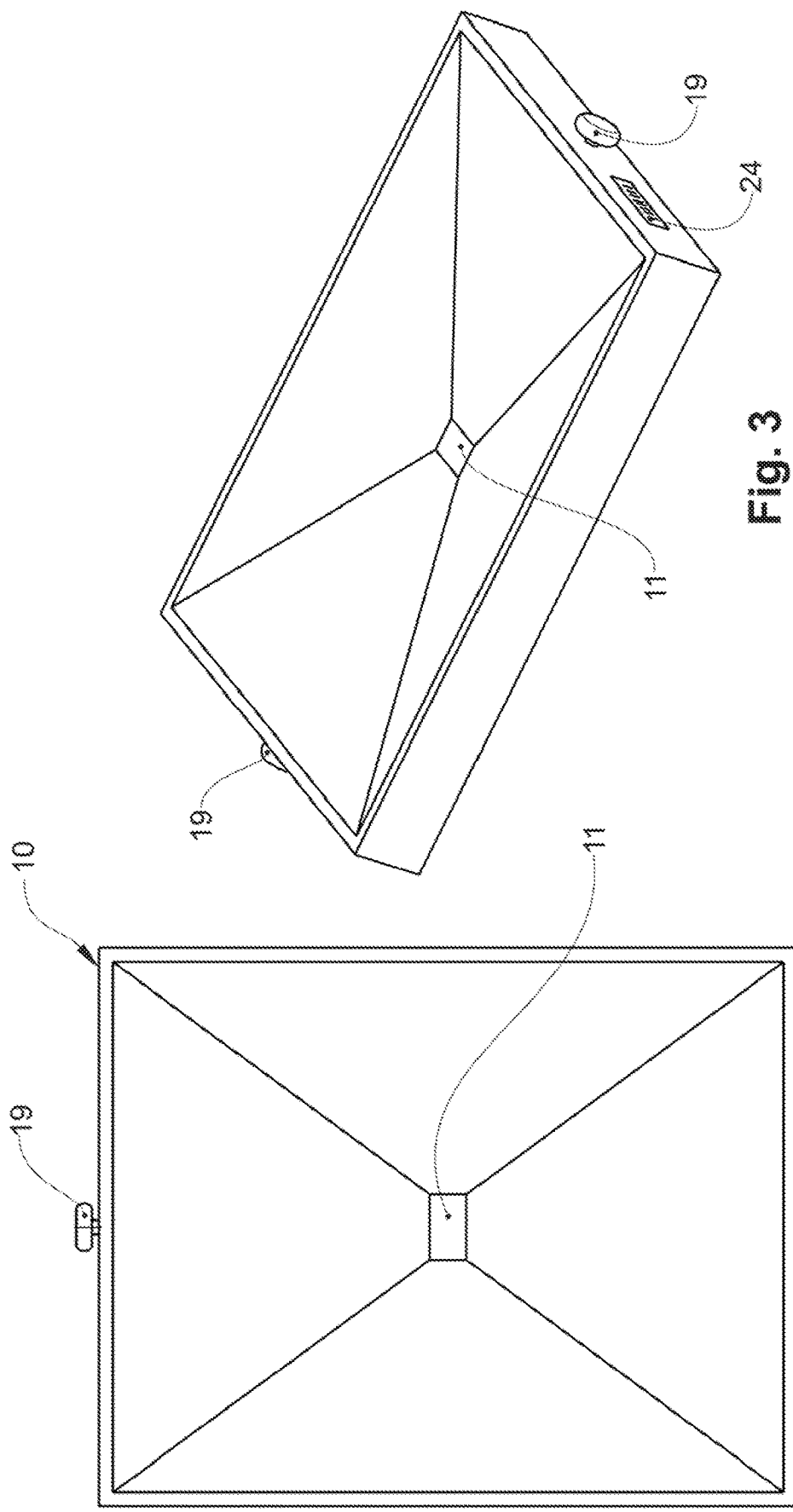

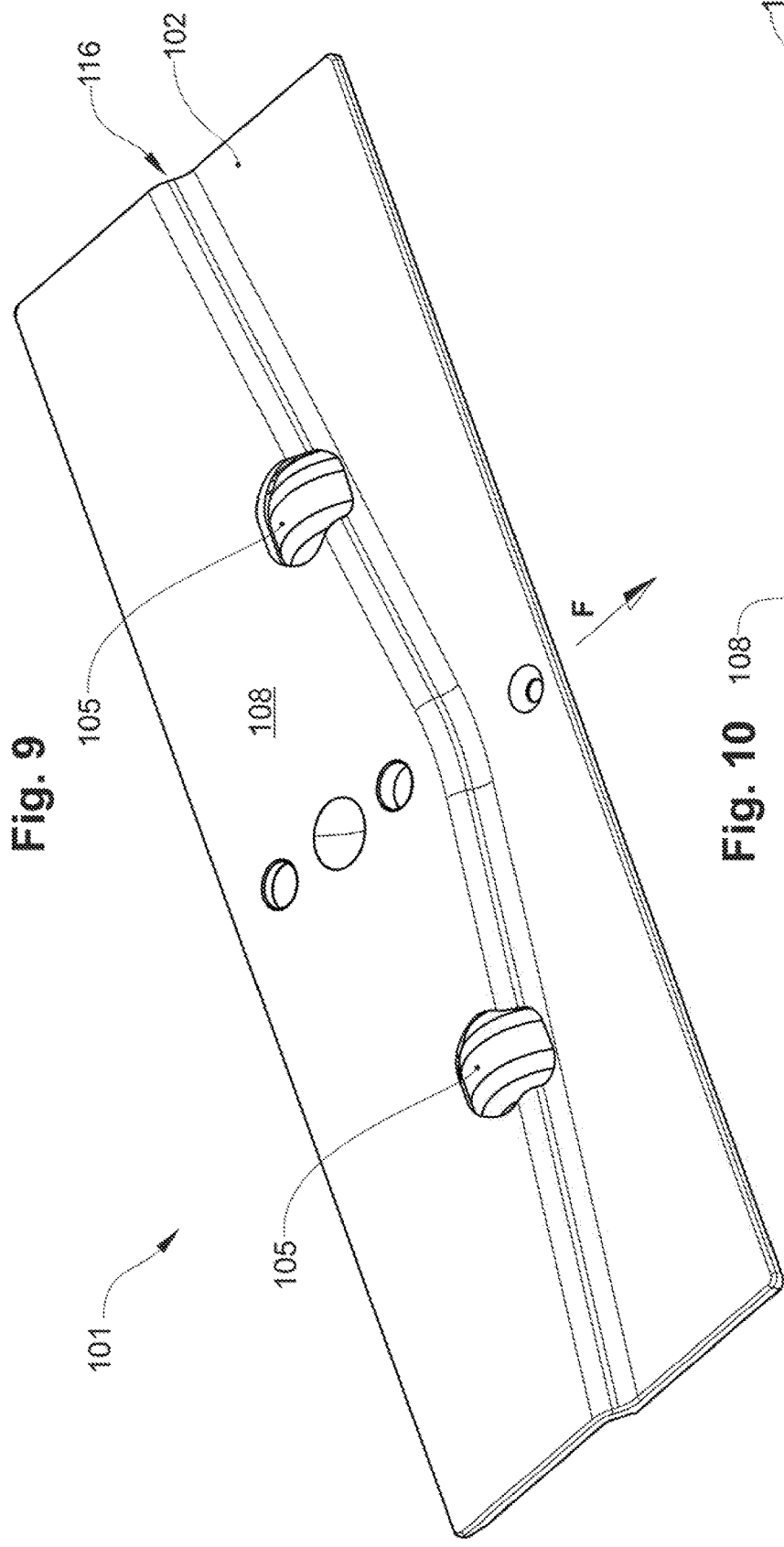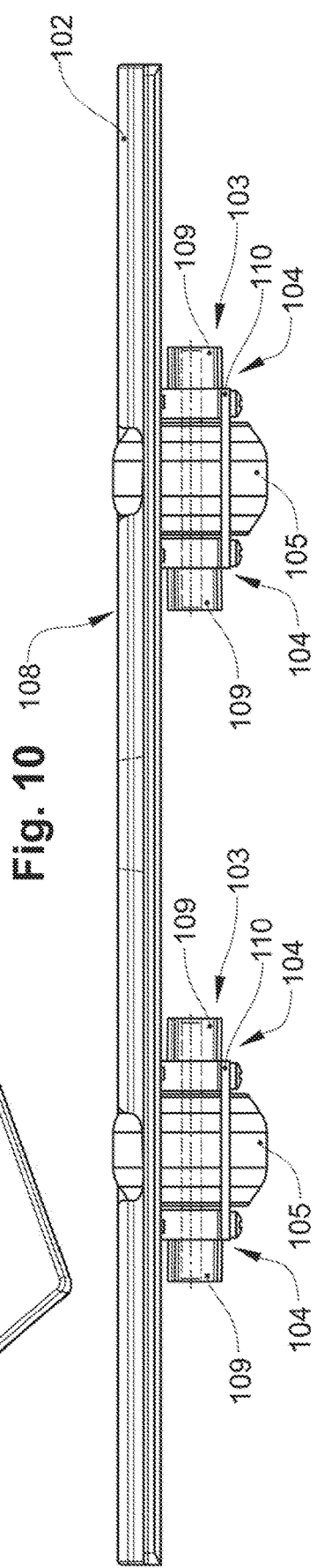

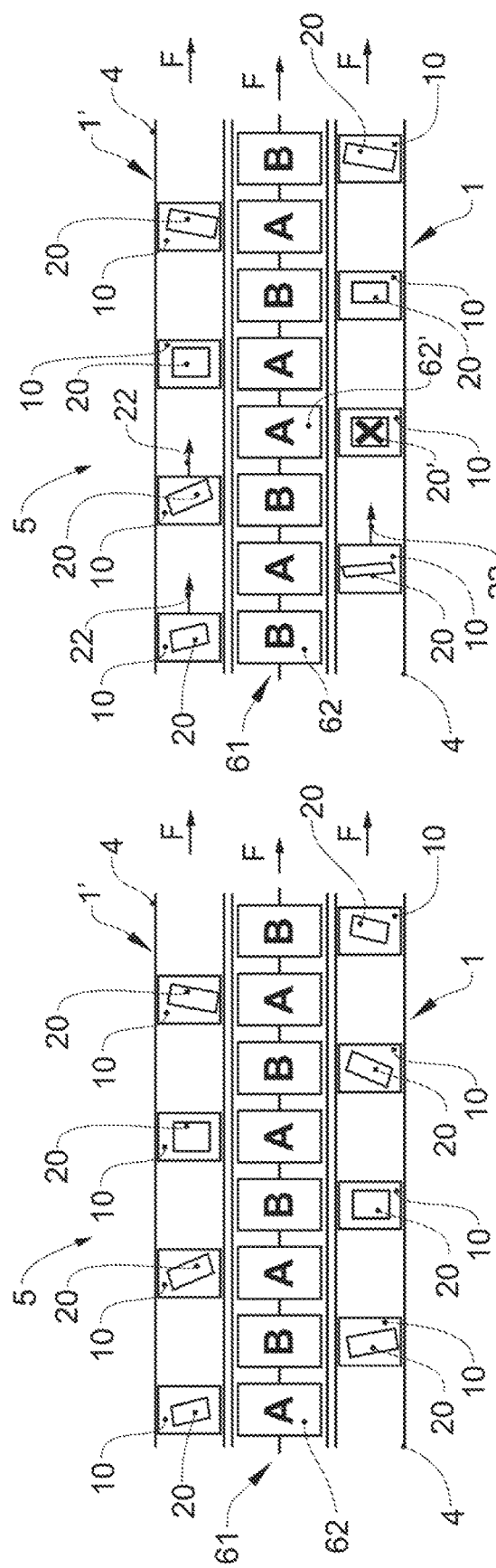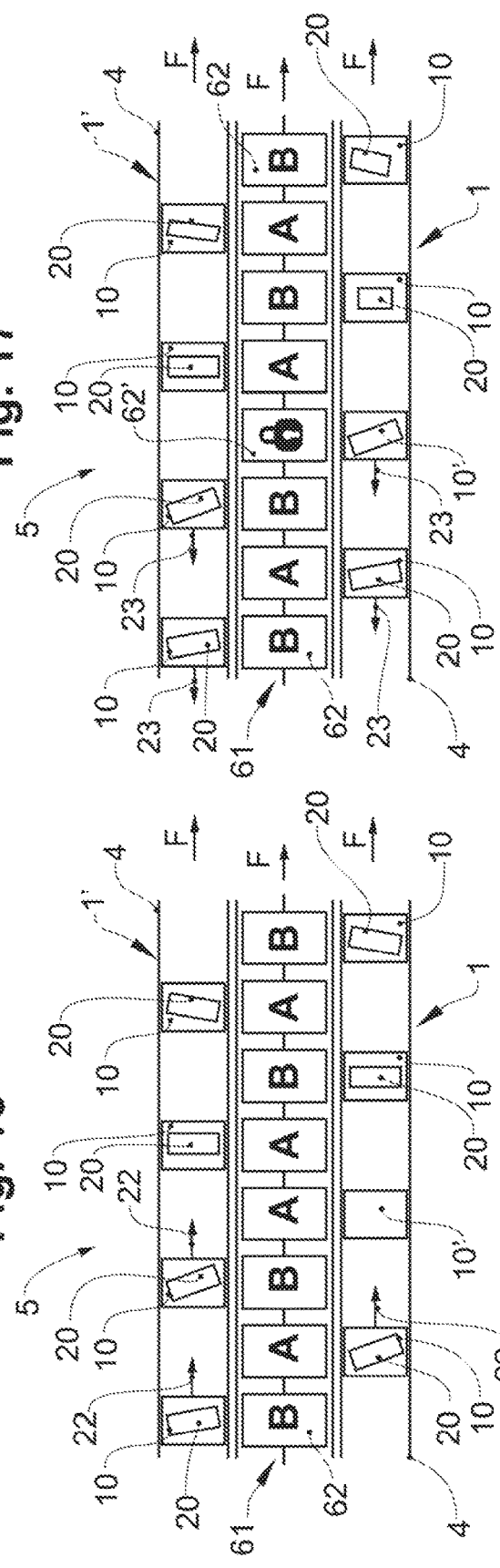

METHOD AND DEVICE FOR TRANSFERRING CONVEYED ITEMS BETWEEN TWO CONVEYING APPLIANCES, AS WELL AS A CONVEYING SYSTEM

BACKGROUND OF THE INVENTION

Field of the Invention

The invention lies in the field of conveying technology and relates to a method for transferring conveyed items from a feed conveyer onto an outgoing conveyor, as well as to a conveying system for carrying out the method.

Description of Related Art

Increasing quantities of conveyed items, mostly in the form of parcels, are processed in handling centres due to the increasing online trade. The massive quantities of conveyed goods or items are a huge challenge to the handling centres. Indeed, the conveyed items are to be processed in the handling centres as quickly as possible, so that these reach their addressee as soon as possible.

The arriving conveyed items are fed into sorting and distribution systems in the handling centres. In one of the first steps, the identification information, which is arranged on the conveyed item is detected, which is to say acquired, and such information permits the assignment of the conveyed item to a mailing locality.

This mailing locality can be e.g. a country, a region, a district, a town, a street or a complete address of an addressee.

One of the main tasks of the handling centres is to sort the conveyed items according the mailing localities by way of so-called sorters and to group them into groups that correspond to the mailing localities.

Thus, for example, so-called tilt-tray sorters, which form a conveying system for the transport and sorting of conveyed items by way of tiltable conveying trays, are known. Concerning tilt-tray sorters, the conveyed items are conveyed past delivery locations in tilt-trays. As soon as the conveyed item has reached the correct delivery location, the tilt-tray is brought into an oblique position via a tilting mechanism and the conveyed items slide laterally over the conveying tray to a take-over appliance.

The tilt-trays are arranged on a travel mechanism. The travel mechanism can consist of conveying elements which are linked to one another and can be slidingly or rollingly guided along an underlay, in particular along a guide rail, via sliding elements or runner rollers.

Such a tilt-tray sorter is described for example in the publication document U.S. Pat. No. 5,632,589.

The publication documents WO 2017/076541 A1 and WO 2013/075714 A1 each describe a sorting mechanism with tiltable conveying stretch segments for sorting parcels or pieces of luggage.

The publication document EP 1 719 721 B1 describes a sorting appliance with an inclining appliance for tilting the conveying member with the conveying container for the purpose of delivery of the products out of the conveying containers.

Despite the fact that the degree of automation is large in such handling centres, certain working steps are still to be carried out manually.

This is the case for example with conveyed items which due to particular characteristics, such as, e.g., their geometry, shape or structure, cannot be brought into a conventional, fully automated processing process.

In contrast, these particular conveyed items must be processed separately and fed to a sorter. The feeding of the conveyed items into the processing process as a rule is effected manually from transport containers or holding containers.

However, before such conveyed items can be fed to a sorter, identification information, which permits the mailing locality necessary for the sorting to be determined, must be determined from these via a detection device.

The detection (acquisition) of the identification information is therefore effected in a feed conveyor that is designed as a supply conveyor and to which the conveyed items are fed manually.

Since the conveyed items can be shapeless, e.g. roundish (tilt away or roll away from the conveying track) as well as include packaging cords (danger of entanglement with the conveying member) and exposed adhesive surfaces of adhesive tapes (sticking to the conveying member), these items are conveyed in the feed conveyor in particular in conveying trays. The conveying trays shield the conveyed items from the conveying member and further provide these with an encompassing lateral retention.

After a successful identification, the conveyed items are conveyed into a transfer region by way of the supply conveyor for the purpose of transfer to a tilt-tray sorter.

Since the supply conveyor and the sorter as a rule are operated at different conveying speeds, the transfer procedure from the supply conveyor to the sorter is of an increased complexity.

SUMMARY OF THE INVENTION

It is hence an object of the invention to put forward a method and an appliance for the transfer of conveyed items from a feed conveyor, in particular from a supply conveyor, onto an outgoing conveyor, including conveying containers, in particular onto a tilt-tray conveyor. The method and the appliance are to permit the conveyed items to be efficiently transferred from the feed conveyor onto the outgoing conveyor amid the optimal utilisation of the conveying capacities of both conveyors.

A further object of the present invention is to keep the return of non-transferred conveyed items of the feed conveyor as low as possible.

A further object of the present invention is to occupy the conveying containers of the outgoing conveyor with conveyed items from the feed conveyor with as little gaps as possible.

The invention thus relates to a method for transferring conveyed items from at least one feed conveyor onto an outgoing conveyor, in a transfer region. The at least one feed conveyor includes a conveying member, which is driven along a feed conveying stretch, for conveying conveyed items into the transfer region. The outgoing conveyor includes conveying containers for taking over the conveyed items, which are delivered by the at least one feed conveyor, the conveying containers being movable along a transfer conveying stretch.

In particular, the conveying member is driven in a continuous manner during the conveying operation.

The at least one feed conveyor now according to the invention includes an acceleration device for accelerating conveyed items, which lie on the conveying member, relative to the conveying speed of the conveying member and towards the transfer region, in particular along the feed conveying stretch.

For this, the feed conveying stretch in particular forms an acceleration stretch section upstream of the transfer region in the conveying direction. In particular, the acceleration stretch section is arranged directly upstream of the transfer region. The acceleration device is arranged along the acceleration stretch section.

The conveyed items now towards the transfer region are accelerated relative to the conveying speed of the conveying elements via the acceleration device and for the purpose of delivery of the conveyed item are brought into a cyclically synchronous side-by-side conveying with a conveying container of the outgoing conveyor.

This means that the manner in which the conveyed items of the feed conveyor are accelerated along the acceleration stretch and the conveying speed at which they are moved is such these are conveyed into the transfer region in a cyclically synchronous manner with the conveying containers of the outgoing conveyor and hence form so-called transfer pairings with the conveying containers of the outgoing conveyor.

Transfer pairing means that considered in the conveying direction, a conveyed item of the feed conveyor is arranged next to a conveying container of the outgoing conveyor for the purpose of transfer of the conveyed items, i.e., a side-by-side conveying is formed.

In particular, the feed conveying stretch of the at least one feed conveyor and the transfer conveying stretch of the outgoing conveyor run parallel next to one another in the transfer region and in particular also along the aforementioned acceleration stretch section. In particular, the conveying directions of the two conveyors are equal in the transfer region and also along the acceleration stretch section. In particular, the conveying stretch runs in a straight line in the transfer region and also along the acceleration stretch section.

According to a particular embodiment variant of the invention, in the transfer region a feed conveying stretch of a feed conveyor runs along the transfer conveying stretch of the outgoing conveyor on both sides considered in the conveying direction. This means that the transfer conveying stretch of the outgoing conveyor runs between two feed conveying stretches of a feed conveyor. Both feed conveying stretches include an acceleration stretch section, which is described above.

The two feed conveying stretches can be formed by a common feed conveyor. However, in particular the two feed conveying stretches are formed by separate feed conveyors.

Accordingly, in the transfer region, conveyed items are transferred into the conveying containers of the outgoing conveyor in an alternating manner from both sides, which is to say from both feed conveying stretches.

The feed conveying of conveyed items into the transfer region from two feed conveyors can be provided if the outgoing conveyor has the significantly higher, i.e., double, the processing capacity and accordingly is also operated at a higher conveying speed than the feed conveyor or feed conveyors. A full utilisation of the outgoing conveyor can be achieved in this manner.

According to the aforementioned embodiment variant, in regular operation in particular every second conveying container of the outgoing conveyor is loaded from a first side and every second conveying container of the outgoing conveyor, which shifted by one, is loaded with a conveyed item from a second side.

Regular operation in particular means that each conveyed item, which is conveyed into the transfer region, is transferred onto the outgoing conveyor and that each conveying container of the outgoing conveyor takes over a conveyed item from the feed conveyor or from the feed conveyors.

This means that in an embodiment of the method according to the aforementioned embodiment variant, the conveyed items of a first feed conveyor are accelerated along the acceleration stretch section, wherein the conveyed items can be brought into a cyclically synchronous side-by-side conveying with each second conveying container of the outgoing conveyor and form a transfer pairing with these.

The conveyed items of the second feed conveyor are likewise accelerated along the acceleration stretch section, wherein the conveyed items are brought into a cyclically synchronous side-by-side conveying with each second conveying tray of the outgoing conveyor, which is shifted by one, and form a transfer pairing with these.

In particular, the conveying containers of the outgoing conveyor are moved through the transfer region at a uniform speed.

The conveying containers of the outgoing conveyor are moved in the transfer region and in particular also along the acceleration stretch section in particular in a manner in which they are uniformly distanced to one another in the conveying direction.

According to a further development of the invention, the feed conveyor includes conveying containers, which lie on the conveying member in a connection-free manner and in which the conveyed items are conveyed along the feed conveying stretch into the transfer region.

Accordingly, that which has been specified above with regard to the conveying and positioning of the conveyed items along the feed conveying stretch also applies to the conveying containers.

The conveying containers of the feed conveyor in particular form a deepening, e.g., a concave deepening, for receiving the conveyed item. In particular, the conveying containers are open to the top. The conveying container can be a conveying crate, a conveying dish or in particular a conveying tray.

The conveying containers of the outgoing conveyor likewise in particular form a recess, e.g. a concave recess, for receiving the conveyed item. In particular, the conveying containers are open to the top. In particular, the conveying containers are conveying trays.

Now, given a disturbance of the aforementioned regular operation, so-called transfer special cases occur, these no longer belonging to aforementioned regular operation.

According to a first such transfer special case, no conveyed item is to be or can be delivered onto the outgoing conveyor from a conveying container of a feed conveyor that is conveyed through the transfer region. The conveying container of the feed conveyor is therefore not ready for transfer.

Rather, the conveyed item is to be conveyed past the transfer region and is to be conveyed back, e.g., into a loading stretch or discharged at a subsequent discharge device.

It can also be the case that the conveying container of the feed conveyor includes no conveyed item. Accordingly also no conveyed item can be delivered onto the outgoing conveyor.

An execution of this transfer special case according to the afore-described regular operation would mean that the conveying container of the outgoing conveyor that is paired with the conveying container of the feed conveyor that is not ready for transfer would receive no conveyed item in the transfer region and would consequently remain empty. However, by way of this, conveying capacities of the outgoing conveyor would unnecessarily be left unused.

According to a further development of the method, one therefore envisages conveying containers of the feed conveyor, which, considered in the conveying direction, are subsequent downstream of a conveying container of the feed conveyor that is not ready for transfer, along both feed conveying stretches and considered in the conveying direction being repositioned to the front by one conveying container position of the outgoing container by way of the acceleration device.

Repositioning means that the affected conveying containers along the feed conveying stretch assume a transfer position, which is different from regular operation.

In particular, the repositioning is effected along the acceleration stretch section.

Since, as has already been described above, the conveying containers of the outgoing conveyor are alternately loaded with conveyed items from both sides, then in this case a conveying container of the oppositely lying feed conveying stretch advances or moves up in the conveying direction to the level of the affected transfer pairing with the conveying container, which is not ready for transfer. The affected conveying container of the outgoing conveyor consequently forms a transfer pairing with two conveying containers of the outgoing conveyor.

Accordingly, a conveyed item is delivered from the moved-up or advanced conveying container of the feed conveying stretch on the other side of the transfer stretch onto a conveying container of the outgoing conveyor of the affected transfer pairing.

The subsequent conveying containers of both feed conveying stretches accordingly move up in the conveying direction by one conveying container position of the outgoing conveyor. This leads to the fact that the alternating-sided delivery of the conveyed items shifts by one conveying container position of the outgoing conveyor.

By way of this, one succeeds in all conveying containers of the outgoing conveyor being loaded with conveyed items despite a conveyed item not having being transferred out of the conveying container of the feed conveyor.

According to a second transfer special case, no conveyed item can be delivered to a conveying container of the outgoing conveyor, which is conveyed through the transfer region. The conveying container of the outgoing conveyor is not therefore ready for transfer The presence of a conveying container of the outgoing conveyor that is not ready for transfer can be of a technical nature due to the affected conveying container, e.g., being defect. It can also be the case that the respective conveying container is already occupied by a conveyed item.

An execution of this transfer special case according to the afore-described regular operation would mean that the conveying container of the feed conveyor, which is paired with the conveying container of the outgoing conveyor that is not ready for transfer, cannot deliver its conveyed item in the transfer region and would herewith have to convey it back. By way of this, however, conveyed items that are ready for transfer would be unnecessarily held back in the feed conveyor.

According to a further development of the method therefore, given the presence of a conveying container of the outgoing conveyor, which is not ready for transfer and into which no conveyed item can be transferred, one envisages the conveying container of a feed conveyor that forms a transfer pairing with the conveying container that is not ready for transfer, as well as conveying containers which on both feed conveying stretches are subsequent to this in the conveying direction being repositioned back by one conveying container position of the outgoing conveyor considered in the conveying direction by way of the acceleration device.

In particular, the repositioning is effected along the acceleration stretch section.

Accordingly, the conveying container of the outgoing conveyor that is not ready for transfer does not form a transfer pairing in the transfer region. Here too, this leads to the delivery of the conveyed items on alternating sides shifting by one conveying container position of the outgoing conveyor.

By way of this, one succeeds in all conveyed items of the conveying containers of the feed conveyors that are conveyed into the transfer region being able to be delivered onto conveying containers of the outgoing conveyor despite the presence of a transport container of the outgoing conveyor that is not ready for transfer.

The conveying member of the at least one feed conveyor is driven along the feed conveying stretch via a drive for the purpose of conveying the conveyed items or the conveying containers.

In particular, the conveying member is guided in a circulating manner, so that the conveying facility forms a closed conveying stretch that also includes the feed stretch.

The conveying member forms a sheet-like (two-dimensional) main surface, which faces the conveyed item and defines the conveying stretch.

In particular, the main surface defines a separating surface between the conveyed items or the conveying containers, which are conveyed at the top, and the facility parts such as roller holders, sub-support, guide channel or drive body, which are arranged at the bottom.

The main surface, for example, prevents objects from being able to fall through intermediate spaces between the rollers, as yet explained hereinafter. The main surface also serves for the operational reliability since no or only small gaps exist between the conveying elements and the risk of jamming, snagging or the dragging is reduced.

Furthermore, the conveying member includes at least one conveying element. In particular, the at least one conveying element is designed in an extensive manner, which is to say as sheet-like element. In particular, the main surface is designed from a surface of the at least one conveying element that faces the conveyed item.

In particular, the conveying member includes several conveying elements, which are arranged along the conveying stretch and which, in particular, form the sheet-like main surface. The conveying elements can overlap one another in the conveying direction.

The conveying member further includes rollers that are arranged on the at least one conveying element via roller holders and are rotatably mounted about roller axes in the rotor holder. The roller holder can be a bearing cage.

The rollers can now selectively assume the state of an arrested position or a drive position and in particular also a freewheel position, via the roller holders.

The rollers of the conveying member project at least partly beyond the main surface of the conveying member or conveying element, so that the conveyed item or the conveying containers lie on the rollers or their running surfaces. In particular, the rollers project through openings in the conveying element. The conveying container can lie partly or, in particular, completely on the rollers.

The roller holders and the rollers are each part of a roller mechanism. The different states of the rollers in particular are now created by active elements that act upon the roller mechanism.

Herein, the rollers are rotatably mounted in the roller holder in particular about physical roller pivots.

Active elements with regard to the freewheel position can be actuating means, which, during the movement of the conveying member, move the rollers in a freewheel position or hold them in this. In particular, the actuating means are arranged below the main surface or below the at least one conveying element. In particular, the actuating means act upon the roller mechanism from below.

In particular, the actuating means are arranged in the conveying facility in a locally fixed, i.e., stationary manner. This means that the actuating means do not move with the conveying member along the conveying stretch.

In particular, the actuating means are cam guides, along which the conveying member is moved with the roller mechanisms. The actuating means can also be cams that can be engaged and disengaged, so that the rollers can be selectively brought into a freewheel position along a certain conveying stretch.

The actuating means can act upon the physical roller pivots, for example in a direct or indirect manner and therefore bring the rollers into a freewheel position or hold them in this. The actuating means can therefore effect a displacement of the rollers into a freewheel position by way of a direct or indirect force action upon the physical roller pivots. "Indirect" means that the actuating means can act, e.g., also upon a pivot holder, in which the physical roller pivots are held.

In particular, the mentioned actuating means are applied along accumulation stretches.

Active elements with respect to the drive position can be roll guides that drive the rollers during the movement of the conveying member along the conveying stretch.

In particular, the roll guide or its roll surface is arranged below the main surface or below the at least one conveying element. In particular, the roll surface runs parallel to the main surface of the conveying member.

In particular, the roll guides form a roll surface that bears on the running surfaces of the rollers from below. In particular, the roll guide is arranged in the conveying facility in a locally fixed, i.e., stationary manner. I.e., the roll guide is not co-moved with the conveying member along the conveying stretch. The roll guide can be engaged and disengaged, so that the rollers can be selectively driven along a certain conveying stretch.

In the drive position, the rollers roll along the roll surface of the roll guide by way of the conveying movement of the conveying member along the conveying stretch in the conveying direction and are therefore passively driven by the roll guide.

Since the rollers roll on the roll guide at the speed of the conveying member and the tangential movement direction of the running surfaces at the contact location of the conveying containers is directed in the conveying direction, the conveying containers, which lie on the passively driven rollers, are moved in the conveying direction at twice the speed of the conveying member.

According to a further development of the roll guide, this, instead of a stationary roll surface, includes a driven roll element with a correspondingly moved roll surface, such as, e.g., a drive belt or drive band which are driven in a circulatory manner. The roll surface of the roll element can be driven counter to the conveying direction. The roll surface of the roll element can also be driven in the conveying direction.

The rollers that bear on the driven roll element can now be additionally driven in the clockwise direction or counter to this by way of the driven roll element. By way of this, the conveying containers can be driven at an arbitrary speed independently of the speed of the conveying member.

If for example the roll surface of the roll element is driven counter to the conveying direction, then this effects an additional acceleration of the conveying container in the conveying direction.

If, for example, the roll surface of the roll element is driven in the conveying direction, then this effects a slowing-down of the conveying container in the conveying direction compared to a passive drive by the roll guide. Given a suitably high speed of the roll element, the conveying container can even be conveyed more slowly than the conveying speed or counter to the conveying speed.

The acceleration can therefore be a positive or negative acceleration. This means that the conveying containers along the acceleration stretch can be (positively) accelerated or delayed relative to the conveying member.

In particular, the roll element is driven by a drive that is controlled via the control device.

In particular, the mentioned roll guides are applied along acceleration stretch sections.

Active elements with respect to the arrested position can be the rollers themselves, which bring themselves into the arrested position or remain in this due to their intrinsic weight, i.e., by way of gravity.

The active elements can also be the conveying containers and/or the conveyed item, which with their resting weight bring the rollers into an arrested position or hold them in this.

For this, the roller holder can include an arresting element, on which the rollers bear due to their intrinsic weight and/or by way of the resting weight of the conveying container and/or of the conveyed item.

Herein, the arresting element and the roller form a friction contact that prevents a free rotation of the rollers. The friction contact therefore blocks the rotation of the rollers. In particular, the rollers can bear on the arresting element with their running surfaces.

Accordingly, the conveyed items or the conveying containers are conveyed at the conveying speed of the conveying member in the arrested position of the rollers. Herein, the rollers act upon the conveying containers as catches (drivers/dogs).

For this, in particular the running surfaces of the rollers have a high coefficient of friction. This ensures a high static friction and sliding friction with the conveying containers that lie on these or with the arresting element. The rollers can include, e.g., a running surface that is designed in a rubbered manner.

In particular, the arrested position is applied along a loading (feed) stretch or generally with a conveying operation.

According to a further development of the invention, the rollers are mounted in the roller holder such that these permanently project at least party beyond the main surface of the conveying element. Permanently means over the whole conveying stretch and in all three aforementioned states. This means that the roller mechanism envisages no roller position, in which the running surfaces of the rollers are arranged completely below the main surface.

The rollers are each movable in particular between at least two spatially different positions by way of active elements, as described above. In these positions, the rollers assume different states from the group of states, including the arrested position, the freewheel position and the drive position.

The movement between the at least two spatially different positions in particular includes a movement component transverse to the main surface.

According to a further development of the invention, the rollers are each movable perpendicularly to the main surface between at least two positions by way of the active elements. Accordingly, the rollers project beyond the main surface by a different amount between the at least two positions.

According to a further development of the roller mechanism, the at least one first spatial position can correspond to the arrested position.

According to a further development of the roller mechanism, the at least one second spatial position can correspond to the freewheel position.

According to a further development of the roller mechanism, the at least one second spatial position can correspond to the drive position.

According to a further development of the roller mechanism, the at least one second spatial position can correspond to the freewheel position as well as to the drive position.

The conveying element can be, for example, a plate-like element or a plate element. The conveying member can include several plate elements, which, in particular, overlap one another, along the conveying stretch, and be part of a plate conveyor.

In particular, the plate elements can be fastened to a drive body, e.g., to a pull body, which extends along the conveying stretch. The drive body and, via this, the plate elements are driven along the conveying direction via a drive device.

The drive body can be a jointed (linked) body such as, e.g., a drive chain. The drive body can be guided in particular in a rolling or sliding manner along a guide rail, in particular in a guide channel of a guide rail. The drive body can accordingly include runner rollers or sliding elements.

The at least one conveying element can also be a module of a modular belt chain or mat chain, wherein the main surface is formed by the modular belt chain or mat chain. The conveying elements are accordingly connected to one another in a direct manner, in particular linked to one another.

Basically, the conveying element can also be a continuous conveying belt with through-openings for the rollers.

The rollers of the afore-described conveying member in a drive position are now driven along the at least one feed conveying stretch or the acceleration stretch section for accelerating the conveyed items or the conveying containers relative to the conveying member. Herein, they can be brought to a speed that differs from the conveying speed of the conveying member.

The conveyed items or the conveying containers are consequently conveyed via the driven rollers along the acceleration stretch section at a speed that is different to the conveying speed of the conveying member.

In particular, a roll guide, on which the rollers roll and are driven in this manner is provided along the acceleration stretch section.

According to a further development of the method, the conveying containers of the at least one feed conveyor with the conveyed items are buffered along an accumulation stretch upstream of the transfer region and in particular upstream of the acceleration stretch section considered in the conveying direction. The conveying containers are released individually out of the accumulation stretch towards the transfer region, in particular into the acceleration stretch section, in particular via a release device.

The rollers of the aforedescribed conveying member in particular are in a freewheel position along the accumulation stretch. Accordingly, in particular actuating means that ensure a freewheel position of the rollers are arranged along the accumulation stretch.

In particular, a transfer device for the transfer of the conveyed items from the feed conveyor onto the outgoing conveyor is provided in the transfer region.

The transfer region is defined, in particular, by the active region of the transfer device along the conveying stretch.

The at least one feed conveyor can include an inclining mechanism in the transfer region, for the inclining or tilting or oblique positioning of conveying containers, which is lateral considered in the conveying direction, for the purpose of the delivery of conveyed items onto the outgoing conveyor. Accordingly, the inclining mechanism is part of the transfer device or forms this.

The conveying containers are lifted at one side, in particular at a short side, by way of the inclining mechanism. This can be effected via a suitable cam guide of the inclining mechanism.

The inclining mechanism at least partly and in particular completely lifts the conveying containers from the conveying member. The conveying member moves on in the conveying direction along the inclining mechanism, in particular below the lifted conveying container.

Accordingly, the conveying containers can be conveyed above, which is to say over, the conveying member through the inclining mechanism. In the lifted position, the conveying containers in particular are decoupled from the conveying movement of the conveying member along the inclining mechanism.

The inclining mechanism can include a conveying drive, by way of which the lifted conveying containers are conveyed in the conveying direction independently of the conveying member. The conveying drive can include drive belts. In particular, the conveying drive can be controlled via a control device.

The conveying containers are then lifted in the transfer region by way of the inclining mechanism, for example at one side, and are brought into an oblique position. By way of this, the conveyed item slips away laterally onto a conveying container of the outgoing conveyor.

Subsequently to the transfer of the conveyed item, the inclining mechanism, in particular its cam guide leads the conveying container back again onto the conveying member by way of lowering and negating the oblique position.

Herein, the conveying member is likewise moved through the transfer region below the conveying container.

The transfer device or the inclining mechanism can include a diverter, which interacts with the control device and via which the conveying containers can be selectively brought into an oblique position by the inclining mechanism or—without an oblique position—can be conveyed further on the conveying member, for the purpose of the selective delivery of the conveyed items.

The diverter comes into use in particular in the first transfer special case, according to which a conveyed item on a conveying container of the feed conveyor is not to be transferred. In this case, the respective conveying container lying on the conveying member is conveyed past the inclining mechanism without being brought into an oblique position.

The invention furthermore also relates to an appliance for transferring conveyed items from at least one feed conveyor onto an outgoing conveyor in a transfer region, according to the above description.

The invention further also relates to a conveying system with a feed conveyor and with an outgoing conveyor according to the above description, these conveyors forming a transfer region, for carrying out the method which is described above.

The feed conveyor includes a conveying member that can be driven in a conveying direction along a feed conveying stretch, for conveying conveyed items into the transfer region. The outgoing conveyor includes conveying containers that are movable along a transfer conveying stretch for taking over the conveyed items, which are delivered by the feed conveyor.

The conveying containers of the outgoing conveyor are arranged, in particular, on a drive body, such as a drive chain, which extends along the transfer conveying stretch, and are connected to one another via this body.

In particular, the feed conveyor is a supply (holding) conveyor for supplying conveyed items onto the outgoing conveyor.

In particular, the outgoing conveyor is a tilt-tray conveyor.

In particular, the outgoing conveyor is a sorter such as, for example, a tilt-tray sorter.

In particular, the conveyed items are discrete (piece) items. The conveyed items in particular are parcels. The conveyed items can also be pieces of luggage. Conveyed items in a conveying tray can include one or more individual pieces. The conveyed items can be multi-part packages, stacks, compositions, dispatch groups and the like.

In particular, the present invention is applied in handling centres of parcel services, in distribution centres or in distribution facilities for luggage.

BRIEF DESCRIPTION OF THE DRAWINGS

The subject-matter of the invention is hereinafter explained in more detail by way of embodiment examples which are represented in the attached figures. In each case in a schematic manner are shown in:

FIG. 2: a plan view of a conveying tray of the feed conveyor;

FIG. 3: a perspective view of a conveying tray;

FIG. 9: a perspective view of an embodiment of a conveying member of the feed conveyor, obliquely from above;

FIG. 10: a view of the conveying member of FIG. 9 from the front;

FIG. 16: a plan view along a conveying stretch section of the conveying system according to FIGS. 4-6 directly upstream of the transfer region, in regular operation;

FIG. 17: a plan view along a conveying stretch section of the conveying system according to FIGS. 4-6 directly upstream of the transfer region, according to a first transfer special case;

FIG. 18: a plan view along a conveying stretch section of the conveying system according to FIGS. 4-6 directly upstream of the transfer region, according to a second transfer special case;

FIG. 19: a plan view along a conveying stretch section of the conveying system according to FIGS. 4-6 directly upstream of the transfer region, according to a third transfer special case.

DETAILED DESCRIPTION OF THE INVENTION

Figure 1:
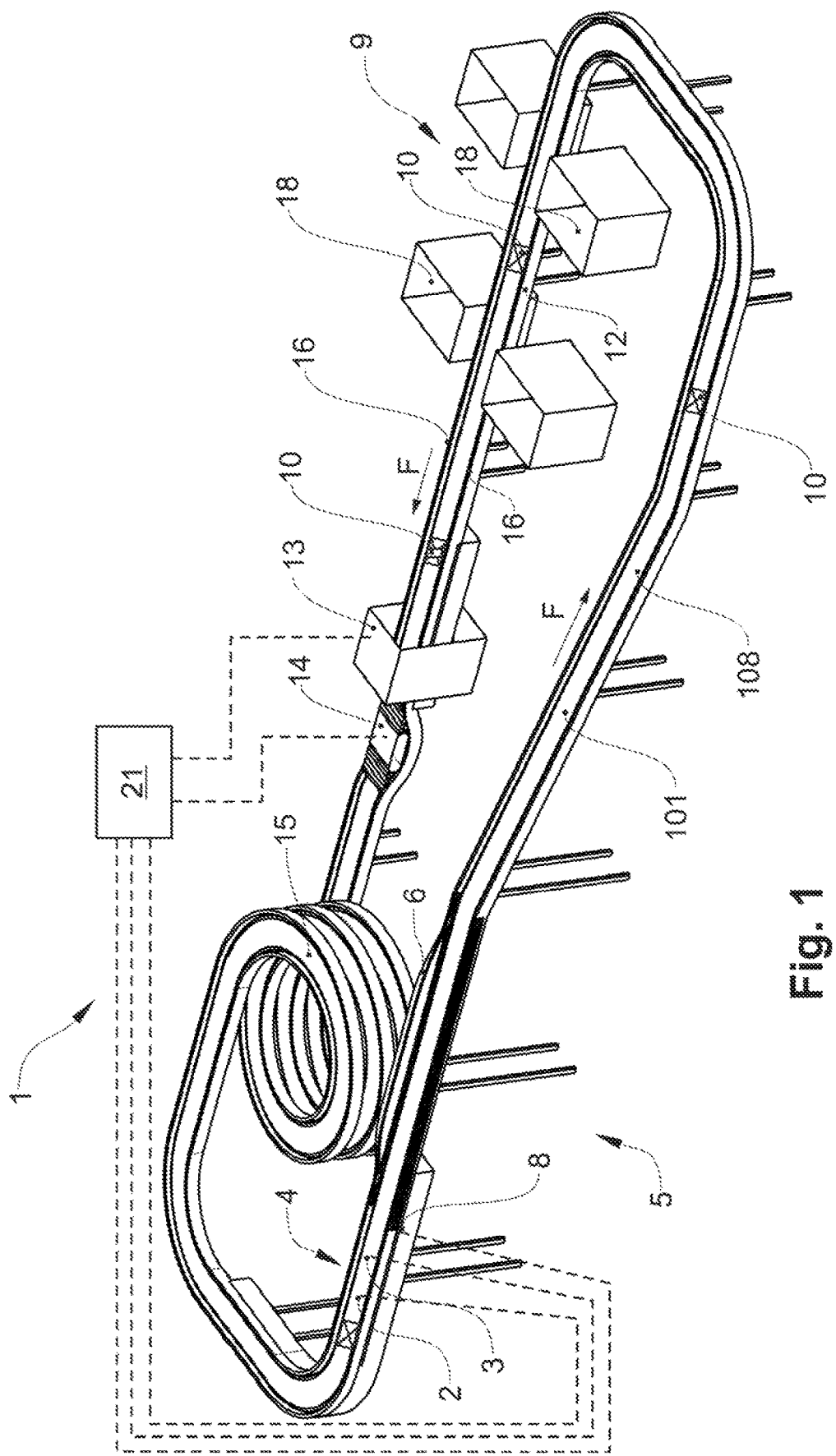
FIG. 1: a perspective view of a feed conveyor.

Basically, in the figures, the same parts are provided with the same reference numerals.

Certain features are not represented in the figures for the purpose of a better understanding of the invention. The embodiment examples which are described hereinafter are merely exemplary for the subject-matter of the invention and have no limiting effect.

FIG. 1 shows a feed conveyor 1 of a conveying system according to the invention. The feed conveyor 1 is designed as a conveyor with a closed conveying stretch and includes a circulating conveying member 101 with an extensive (sheet-like) conveying element 102. The extensive conveying element 102 forms a main surface 108, via which the conveyed item 20 is conveyed (see also FIGS. 9 to 14). The conveying member 101 is described in yet more detail below by way of FIGS. 9 to 14.

The feed conveyor 1 includes conveying containers 10 in the form of conveying trays for receiving conveyed items 20 that lie on the conveying member 101 in a connection-free manner.

The conveying trays 10 each form a deepening 11 for receiving the conveyed items 20. The conveyed items 20 are held laterally thanks to the deepening 11 (see also FIGS. 2 and 3).

The deepening 11 has a continuous, ramp-like ascent towards the sides. This assists in the sliding of the conveyed items 20 out of the deepening 11 given an inclined conveying tray 10.

Furthermore, projecting guide elements 19, via which the conveying trays 10 can be guided along the inclining mechanism 6, which is yet described further below, arranged on the short sides of the conveying trays 10. One or more guide elements 19 can be fastened to the conveying tray, in particular on a short side.

Furthermore, an information label, which carries information regarding the conveying tray, e.g., information for the identification of the conveying tray 10 or the tare weight of the conveying tray 10, is attached to the conveying tray 10.

The feed conveyor 1 forms a loading stretch 9, along which several loading stations 12 are arranged, at which loading stations conveyed items 20, in particular parcels are manually removed from storage containers 18 and continuously deposited into the conveying trays 10, which are conveyed past on the conveying member 101. For this, the conveying member 101 is driven in a continuous manner.

The conveying trays 10 with the conveyed items 20 are conveyed on the conveying member 101 in the conveying direction F past a detecting device 13. The detecting device 13 is designed as an optical multi-side scanner which scans the surface of the conveyed items 20 from several sides for identification information. The detected identification information is transmitted to a control device 21 for further processing.

Address data is determined from the identification information in the control device 21. The procedure from detecting the identification information of the conveyed items 20 until the presence of address data can take from half a minute to one minute.

The conveying trays 10 with the conveyed items 20, subsequently to the detection device 13 are conveyed to a weighing device 14, by way of which the weight of the conveyed items 20 is determined.

The conveyed items 20 are conveyed along a spiral stretch 15 to a higher conveying level subsequently to the weighing device 14.

Amongst other things, the spiral stretch 15 serves for bridging the time until the address data concerning the respective conveyed items 20 has been determined by the control device 21. Specifically, the conveyed items 20 are not conveyed into the delivery or transfer region 5 until the address data of the conveyed items 20 has been determined or it has been ascertained that no address data could be determined for a conveyed item 20.

A straight-lined accumulation stretch 2 connects to the spiral stretch 15, along which accumulation stretch the conveyed items 20 are held back, i.e., buffered, until their release in the direction of the transfer region 5.

For this, considered in the conveying direction F, a release device 3 is provided at the end of the accumulation stretch 2, the release device being controlled by the control device 21 and by way of which the conveyed items 20 can be individually released out of the accumulation stretch 2 in the direction of the transfer region 5.

The accumulation stretch 2 consequently serves to buffer the conveyed items 20 upstream of the transfer region 5. The buffering of the conveyed items 20, on the one hand, is intended to ensure a controlled delivery of conveyed items 20 in the direction of the delivery region 5 and, on the other hand, the buffer is to ensure a regular resupply of conveyed items 20 that are to be fed to the transfer region 5.

Since the conveyed items 20 are stopped or delivered at a significantly lower speed in comparison to the conveying speed of the conveying member 101, along the accumulation stretch 2, means which decouple the conveying of the conveyed items 20 along the accumulation stretch 2 from the conveying speed of the conveying member 101 are provided. These means are yet explained in more detail further below in combination with the description of the conveying member 101.

As already mentioned, a release device, by way of which the conveyed items 20 are individually released out of the accumulation stretch 2 are provided at the end of the accumulation stretch 2.

The conveyed items 20 which are released from the accumulation stretch 2 are conveyed into an acceleration stretch 4, which is arranged upstream of the delivery or transfer region 5 and along which the conveying items 20 are accelerated and conveyed towards the delivery region 5 at a variable speed which differs from the conveying speed of the conveying member 101.

For this, as yet explained in more detail further below, an acceleration device 119 is provided along the acceleration stretch section 4, the acceleration device decoupling the conveying of the conveyed items 20 from the conveying speed of the conveying member 101 along the acceleration stretch 4.

The acceleration or the speed of the conveyed items 20 along the acceleration stretch section 4 is controlled via the control device 21. The acceleration stretch section 4 serves to accelerate the conveying containers 10 with the conveyed items 20 to the conveying speed of a tilt-tray sorter 60, which is designed as an outgoing conveyor and to bring them into cyclically synchronous conveying with the tilt-trays 62 of a tilt-tray sorter 61, which is designed as an outgoing conveyor and to which the conveyed items 20 are to be delivered.

This means that manner in which the conveying trays 10 of the feed conveyor 1, 1' are accelerated along the acceleration stretch section 4 and the conveying speed at which they are moved is such that these are conveyed into the transfer region 5 in a cyclically synchronous manner with the tilt-trays 62 of the tilt-tray sorter 61 and form so-called transfer pairings with the tilt-trays 62.

In the transfer pairing, a conveying tray 10 of the feed conveyor 1, 1' is arranged next to a tilt-tray 62 of the tilt-tray sorter 61 considered in the conveying direction F, for the purpose of the transfer of the conveyed items 20.

The conveying track (conveying path) of the conveying trays 10 of the feed conveyor 1 and the conveying track of the tilt-trays 62 of the outgoing-conveying tilt-tray sorter 61 run parallel next to one another along the acceleration stretch section 4. The conveying trays 10 of the feed conveyor 1 and the tilt-trays 62 of the tilt-tray sorter 61 accordingly move along the acceleration stretch section 4 in the same direction (see also FIG. 7).

An inclining mechanism 6, which moves the conveying trays 10 into a position that is laterally inclined considered in the conveying direction F for the purpose of delivery of the conveyed items 20 onto an outgoing conveyor 61, is arranged in the transfer region 4. For this, the conveying tray 10 is lifted at the respective short side via a cam guide (see also FIGS. 7 and 8). Herein, the cam guide interacts with the guide element 19 on the short side of the conveying tray 10, the guide element having already been mentioned above. This means that the cam guide forms a guide track for the guide element 19.

Concerning this procedure, the conveying tray 10 is lifted from the conveying member 101, so that the conveying member 101 which continues its movement in the conveying direction F below the conveying tray 10, in the region of the inclining mechanism 6 is no longer effective in conveying the respective conveying tray 10.

The second short side, which lies at a lower level and opposite the lifted short side of the conveying tray 10 or the guide element 19 of the conveying tray 10 that is arranged on this short side, is brought into contact with a conveying drive 7 of the inclining mechanism 6 for the purpose of driving the conveying tray 10 through the transfer region 5 in the conveying direction F.

The conveying drive 7 includes a circulating conveying belt, which conveys the conveying trays 10 further along the inclining mechanism 6 in the conveying direction F, instead of the conveying member 101—which moves further in the conveying direction F below the conveying trays 10.

The conveying track of the conveying trays 10 of the feed conveyor 1 and the conveying track of the tilt-trays 62 of the outgoing-conveying tilt-tray sorter 61 run parallel next to one another in the delivery region 5. The conveying trays 10 of the feed conveyor 1 and the tilt-trays 62 of the tilt-tray sorter 61 accordingly move through the delivery region 5 in equal directions (see also FIG. 7).

As soon as the conveying trays 10 have now reached an adequate oblique position or inclination along the inclining mechanism 6, the conveyed item 10 slips out of the deepening 11 of the conveying tray 10 and slides into the adjacent tilt-tray 62 of the transfer pairing.

After delivery of the conveyed items 20 out of the conveying containers 10, these containers are moved along the inclining mechanism 6 again into a non-slanted position via the cam guide and are deposited on the conveying member 101 which moves past below the conveying trays 10. On depositing onto the conveying member 101, the conveying trays 10 leave the inclining mechanism 6 and from then on are again conveyed by the conveying member 101.

Figure 8:
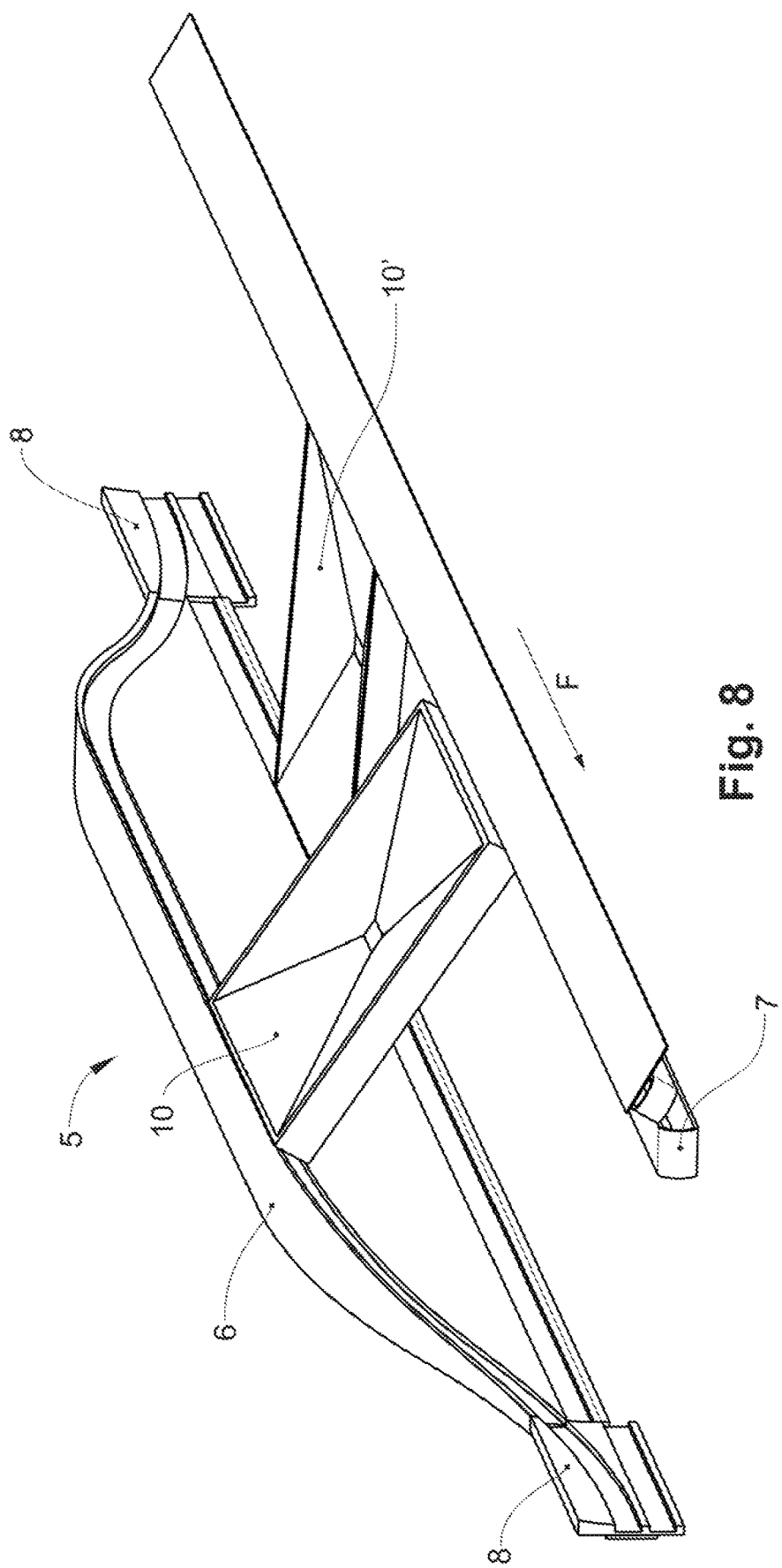
FIG. 8: a perspective view of an inclining mechanism in the transfer region.

A diverter 8, which is connected to the control device 21, is arranged at the entry into the inclining mechanism 6 (see FIG. 8). The diverter 8 can be switched between two positions that permit the conveying trays 10 of the feed conveyor 1, 1' to be selectively conveyed via the obliquely positioning cam guide of the inclining mechanism 6 or continuing to lie on the conveying element 101—without an oblique position. Accordingly, also no conveyed item 20 is delivered from this conveying tray 10'.

For example, the conveying tray 10' can be conveyed past the inclining mechanism in a manner lying on the conveying element 101 if this includes no conveyed item or if the conveyed item 20 that is conveyed in the conveying tray 10' is not to be delivered.

This, e.g., can be the case if the address of the conveyed item 20 could not be determined due to the associated identification information on the conveyed item 20 not being able to be read out by the detection device 13 or due to it not being present or it being located on an underside of the conveyed item 20 which lies on the conveying member 101 and which is not accessible to the detection device 13.

Subsequent to the transfer region 5, the conveying trays 10 are conveyed along a ramp again to the lower conveying level of the loading stretch 9 and are conveyed back into the loading stretch 9.

A further accumulation stretch 17, along which the conveying trays 10 can be accumulated is formed downstream of the transfer region 5 and upstream of the loading stretch 9 considered in the conveying direction F. In this manner, the conveying trays 10 in a metered manner can be released out of the accumulation stretch 17 into the loading stretch 9 where these are again manually loaded with conveyed items 20. A new operating cycle can begin.

Figure 4:
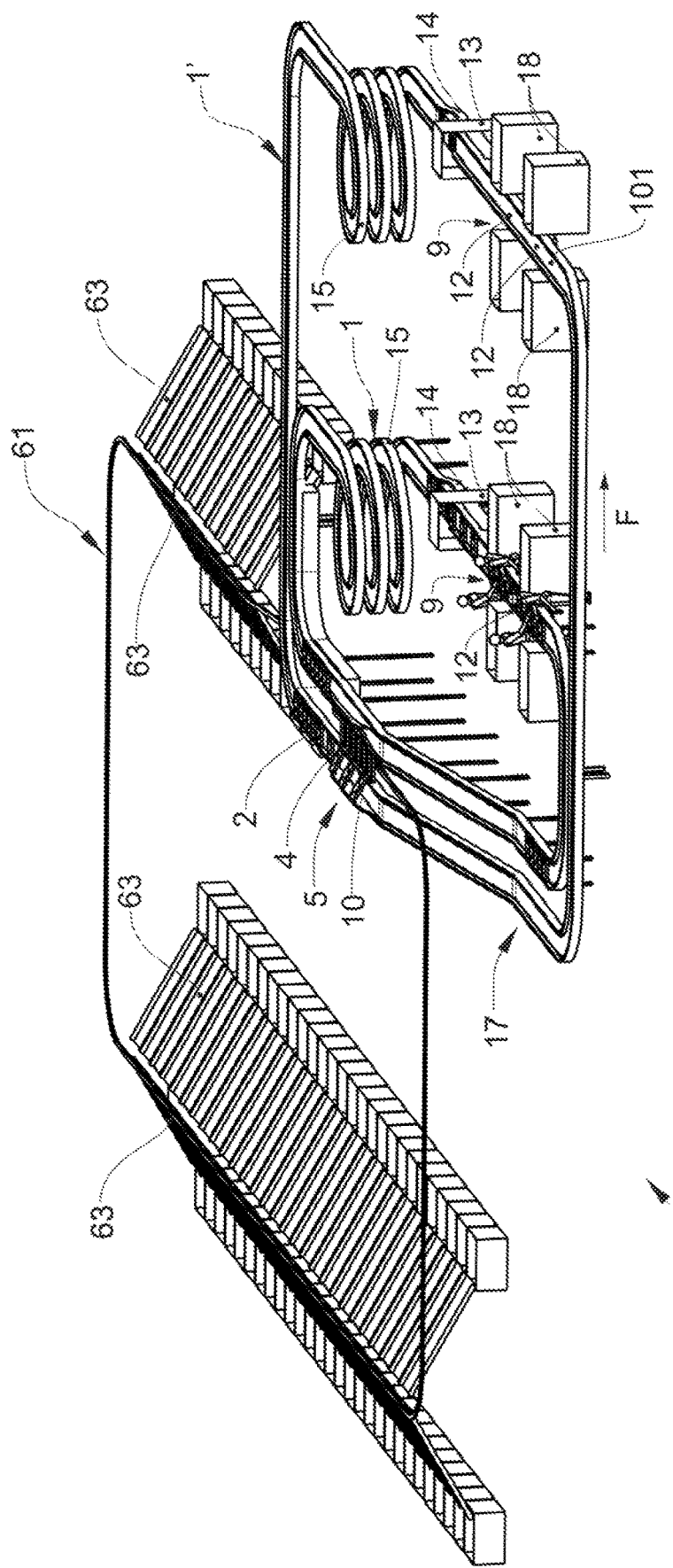
FIG. 4: a perspective view of a conveying system according to the invention, with a feed conveyor.
Figure 5:
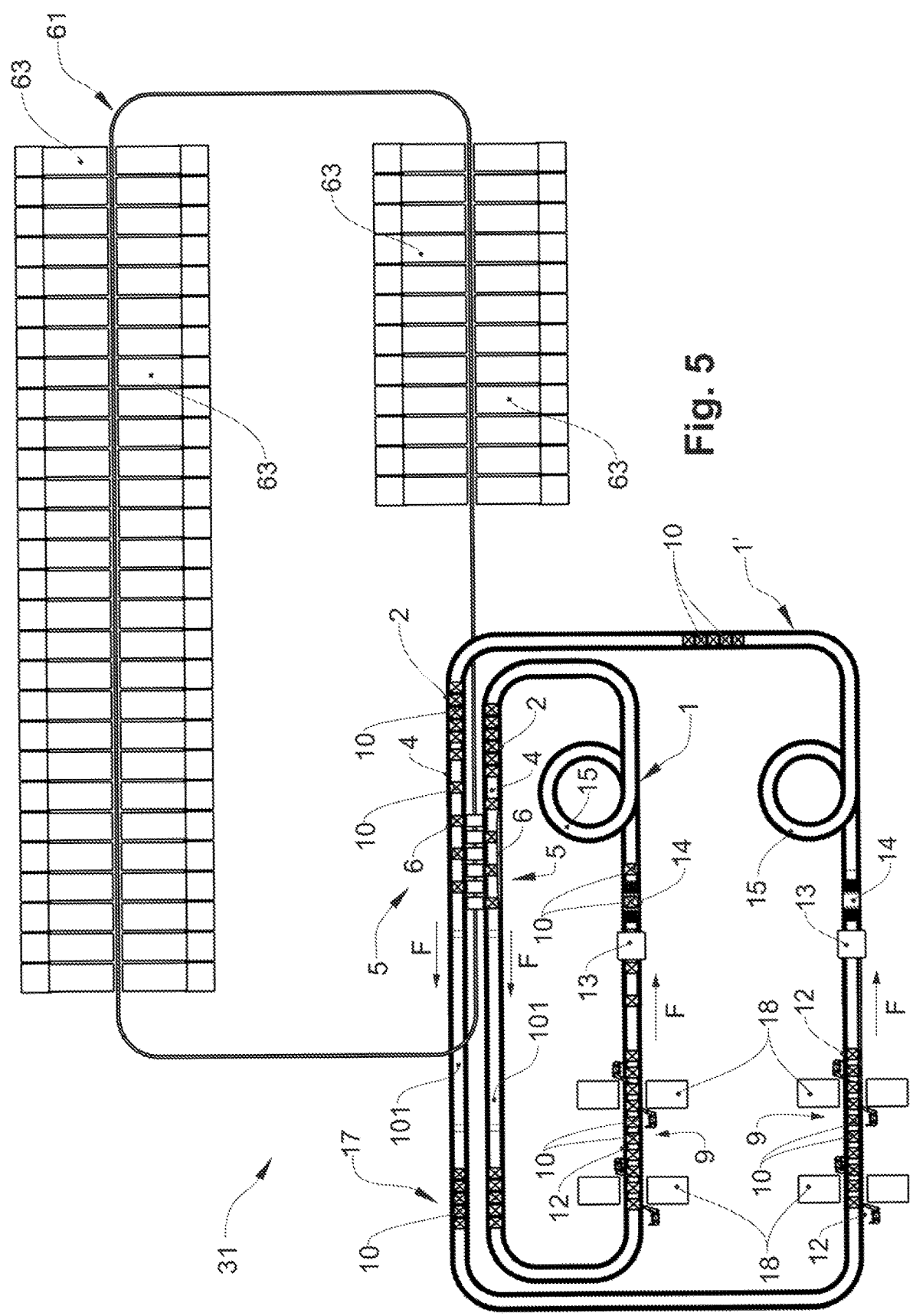
FIG. 5: a plan view of the conveying system according to FIG. 4.
Figure 6:
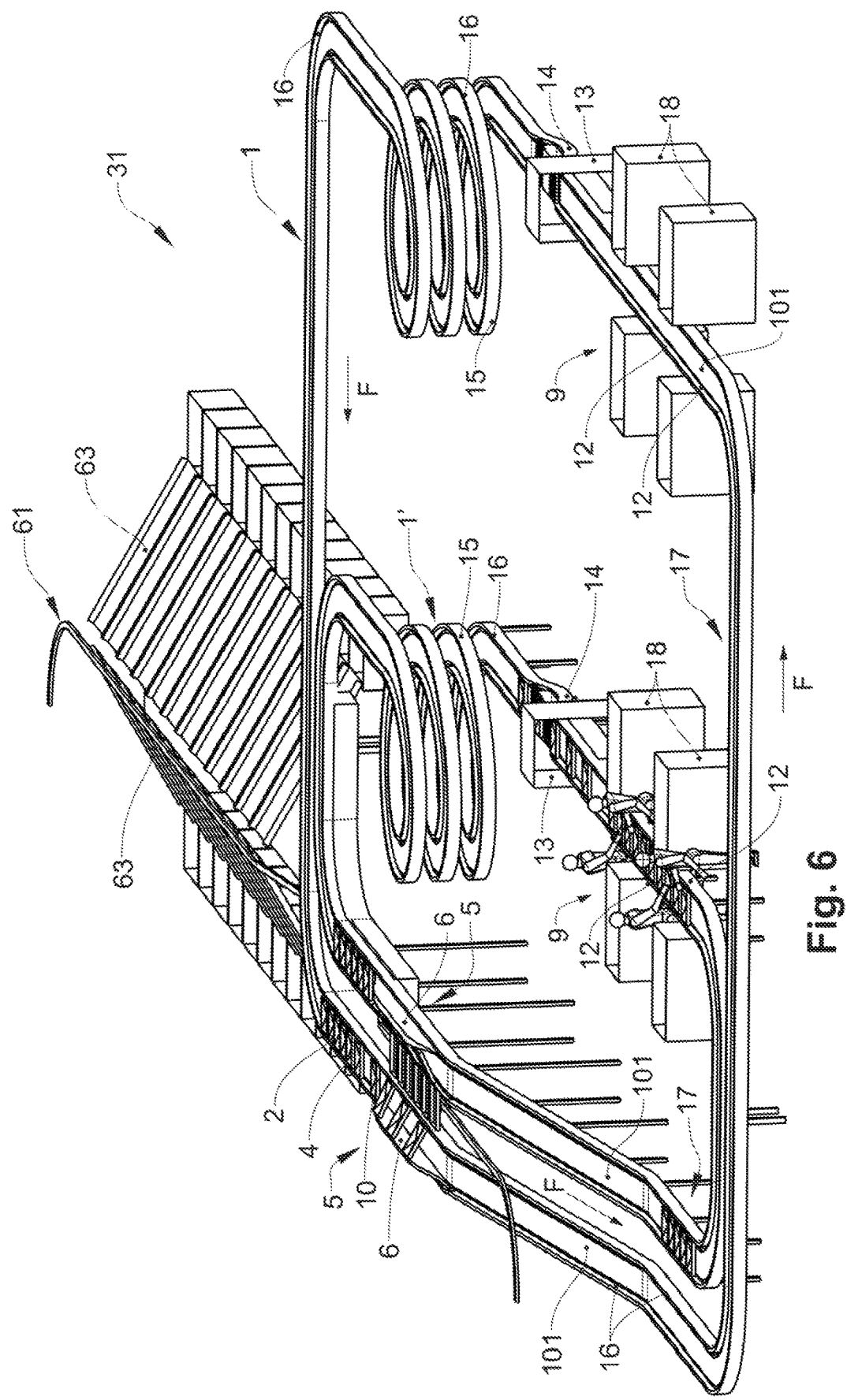
FIG. 6: a perspective detailed view of the conveying system according to FIG. 4, from the region of the feed conveyor.

FIGS. 4 to 6 show a conveying system 31 in different views. The conveying system 31 includes two feed conveyors 1, 1' of the type that is described above. This means that the two feed conveyors 1, 1' basically have the same construction. However, the guidance of the conveying stretch of the two feed conveyors 1, 1' differs from one another.

Furthermore, the conveying system 31 includes an outgoing conveyor 61, which is designed as a tilt-tray sorter. The tilt-tray sorter 61 forms a circulating conveying stretch, along which the so-called tilt-trays 62 are moved for transporting the conveyed items 20. The tilt-trays 62 are fastened to a conveying member, which is continuous in a chain-like manner and is not described in more detail here, at uniform distances to one another. The conveying member is driven and moves the tilt-trays 62 along the conveying stretch.

The tilt-trays 62 of the tilt-tray sorter 61 each include a joint, via which these considered in the conveying direction F can be pivoted to the side for the purpose of ejecting the conveyed items 20.

A multitude of ejecting stations 63 for the controlled ejection of the conveyed items 20 out of the sorter 61 according to defined sorting rules are arranged along the conveying stretch of the tilt-tray sorter 61.

The tilt-tray sorter 61 and the two feed conveyors 1, 1' form a transfer region 5, which also includes the delivery region 4 of the feed conveyor 1 according to FIG. 1.

The conveying tracks of the tilt-tray sorter 61 and of the two feed conveyors 1, 1' run parallel to one another in the transfer region 5 as well as along the acceleration stretch sections 4 of the feed conveyors 1, 1' that are arranged directly upstream. The conveying track of the tilt-tray sorter 61 along the acceleration stretch sections 4 of the feed conveyor 1, 1' as well as in the transfer region 5 runs between the conveying tracks of the two feed conveyors 1, 1'.

Figure 7:
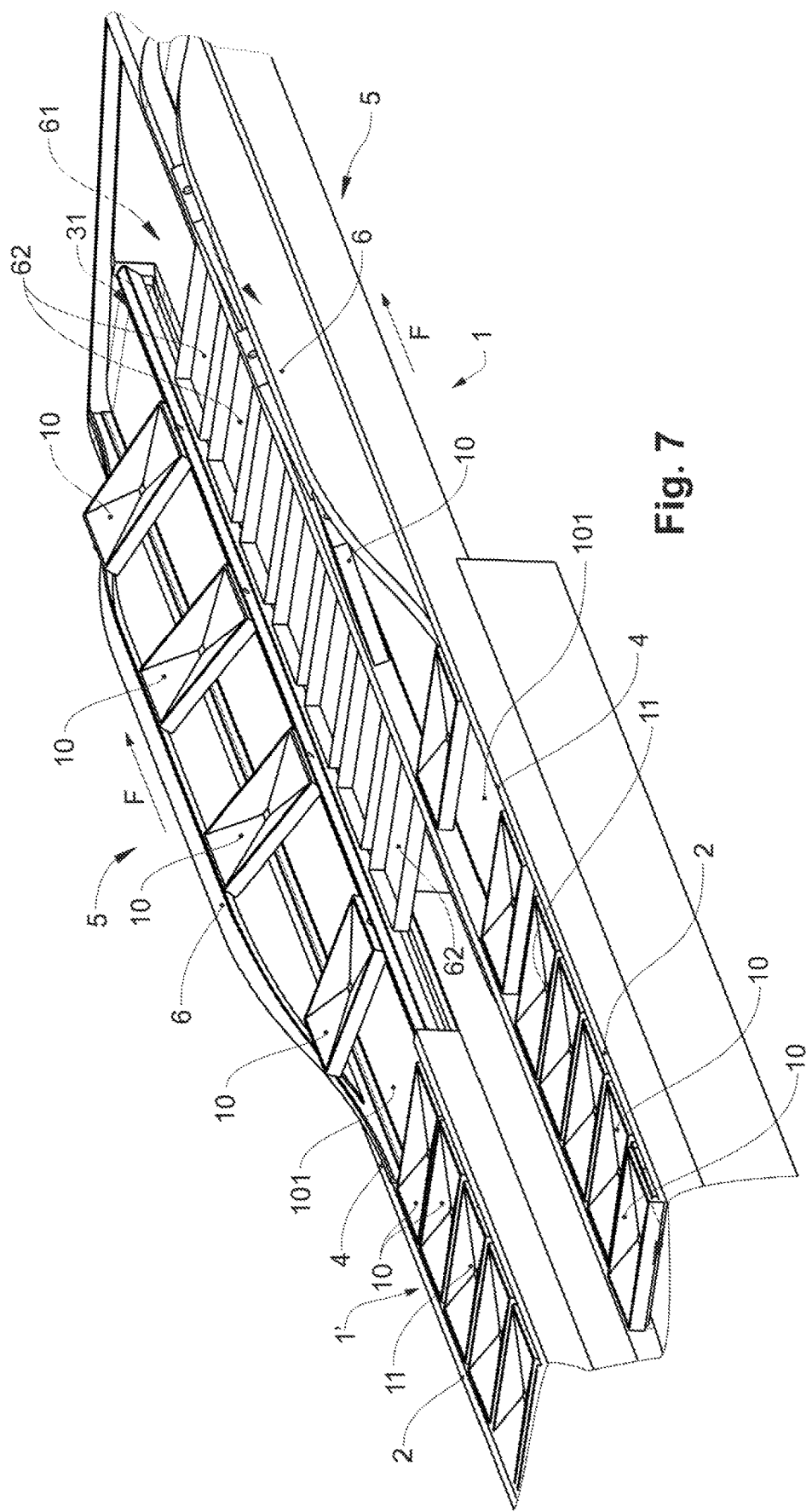
FIG. 7: a perspective view from the transfer region of the conveying system.

In the transfer region 4, the two feed conveyors 1, 1' each include an inclining mechanism 6, which are described above and which are arranged lying opposite one another in a manner such that the conveying trays 10 of the feed conveyors 1, 1' are inclined towards one another, i.e., towards the conveying track of the tilt-tray sorter 61 that runs therebetween (see FIG. 7).

In this manner, the tilt-trays 62 of the tilt-tray sorter 61 can be loaded or fed with conveyed items from two sides. This means that in regular operation every second tilt-tray 62 of the tilt-tray sorter 61 is fed with a conveyed item 20 from a first side and every second tilt-tray 62 of the outward conveyor 61, which is shifted by one is fed with a conveyed item 20 from a second side.

This arrangement is based on the fact that the tilt-tray sorter 62 can be operated with about double the processing capacity compared to the feed conveyors 1, 1', which need to be fed with the conveyed items 20 in a manual manner as mentioned.

In the present case, the tilt-trays 61 of the tilt-tray sorter 61 are accordingly driven at about twice the speed as the conveying member 101 of the feed conveyor 1, 1'.

The processing capacity of the tilt-tray sorter 61 can be fully utilised due to the delivery of conveyed items 20 from two feed conveyors 1, 1', which are operated in parallel.

Accordingly, in the transfer region 5, the conveying trays 10 of a feed conveyor 1, 1' are paired with every second tilt-tray 62 of the tilt-tray sorter 61. Consequently, in the transfer region 5, the conveying trays 10 of the feed conveyor 1, 1' each have double the distance to one another compared to the tilt-trays 62.

The conveying trays 10 are accordingly accelerated subsequently to the accumulation stretch 2 along the acceleration stretch sections 4 for forming the aforementioned arrangement in the transfer region 5 and are brought into a cyclically synchronous conveying with the tilt-trays 62 whilst forming transfer pairings.

Figure 14:
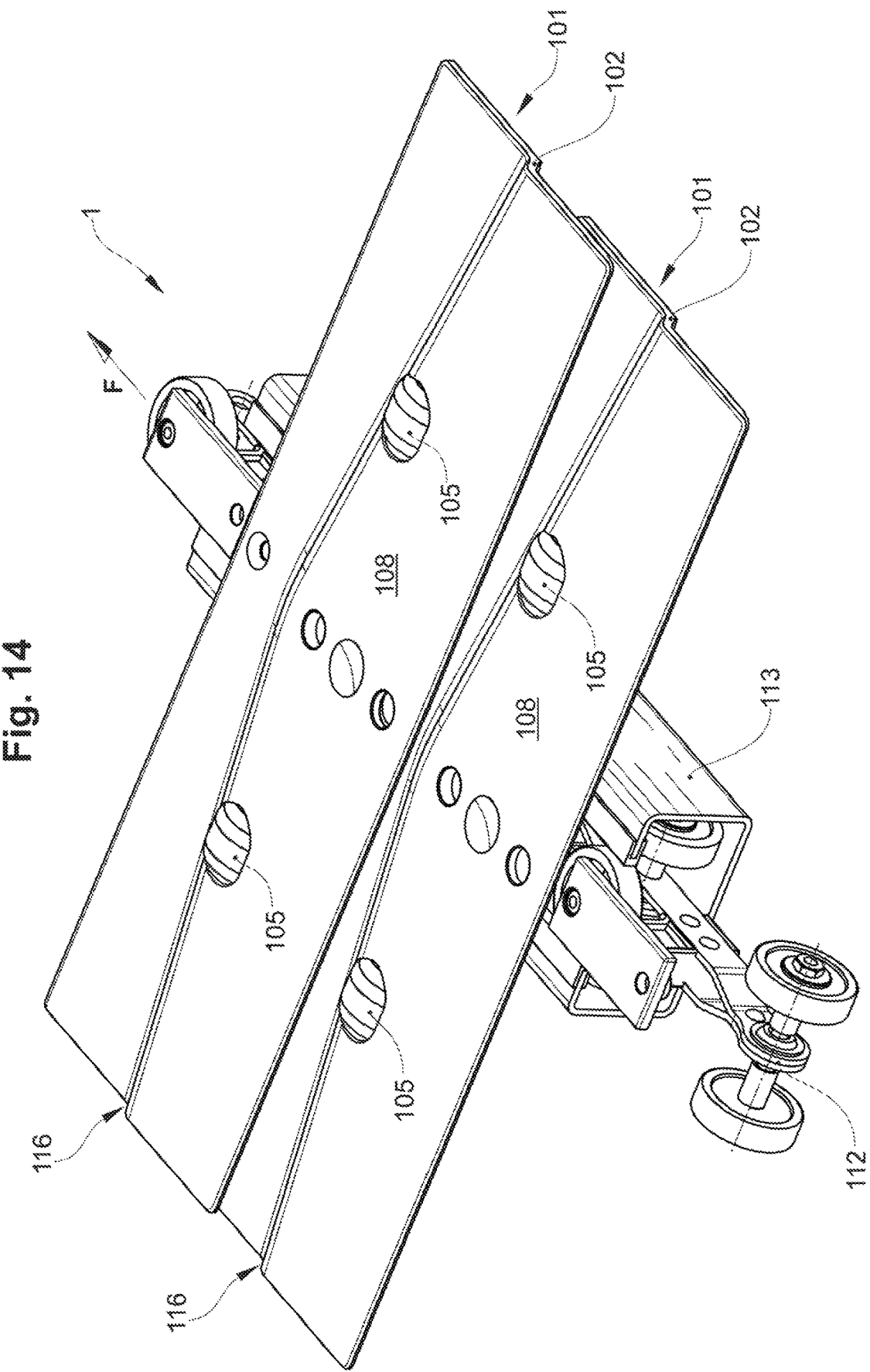
FIG. 14: a perspective view of a detail of the feed conveyor including the conveying member according to FIG. 9, from above.
Figure 15:
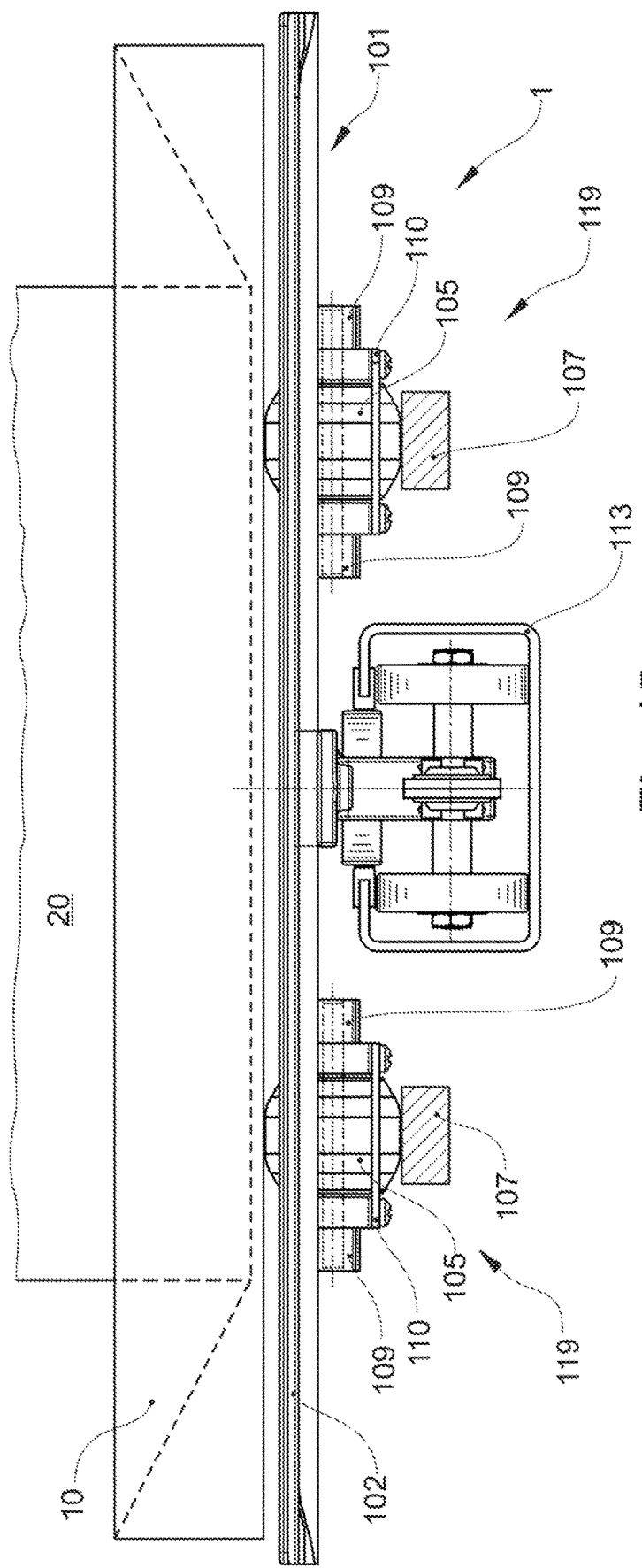
FIG. 15: a view from the front upon a detail of the feed conveyor according to FIG. 14.

FIGS. 9 to 13 show an embodiment example of a conveying member 1 of a feed conveyor 1. FIGS. 14 and 15 show parts of an embodiment example of a feed conveyor 1.

FIG. 9 shows a subassembly of a conveying member 101 as is applied in the feed conveyor 1, 1' according to FIGS.

1 to 8. The subassembly includes a plate-like conveying element 102 which has a width transverse to the conveying direction F of about 40 cm.

The conveying element 102 is designed in a stepped manner at its upper side. One step 116 of the conveying element 102 is designed with an abrupt bend, thus in a v-shaped manner transversely to the conveying direction F and at the side of the conveying element 102 which lies at the top connects a lower-lying surface and a higher-lying surface, wherein the higher-lying surface is part of a main surface 108 of the conveying member. The item 20 to be conveyed can come to lie upon this main surface 108. However, as a rule, the item 20 to be conveyed comes to lie on the conveying element 102 exclusively on the rollers 105.

The lower-lying surface of the upper side of the conveying element 102 is at least partly covered by a part of an adjacent conveying element 102 on application of the conveying member 101 in a feed conveyor 1. The conveying members 101 are designed in this manner so that adjacent conveying members 101 can overlap. A main surface 108, which extends along the conveying member 101, is formed by way of this.

In particular, the conveying member 101 is part of a plate-chain conveyor.

The v-shape of the step 116 herein permits a rotation that is aligned transversely to the conveying direction F (a rotation that lies in a plane containing the main surface 108, a so-called side-arc) of adjacent conveying members 101 relative to one another. The step 116 in the conveying element 102 is designed in an oblique manner in the conveying direction F and has an inclination of 45 degrees disregarding rounded edges.

The conveying element 102 includes two openings in the main surface 108, through which openings a roller 105 projects upwards through the conveying element 102 from below the main surface 8. The openings lie roughly in the middle of the conveying element 102 considered in the conveying direction F. Both openings are distributed over the width of the conveying element 102 transversely to the conveying direction F. The rollers 105 therefore divide the conveying element 102 into three sections transversely to the conveying direction F.

FIG. 10 shows a view of the subassembly from the front, thus considered counter to the conveying direction F. The two rollers 105 are each encompassed by a roller mechanism 103 and are in an arrested position. Both roller mechanisms 103 are each arranged below the main surface 8. Additionally to a roller 105, each of the two roller mechanisms 103 includes a roller holder 104 and an arresting appliance 110. The roller holder 104 here includes two pivot holders 109, which hold the hold the pivot 106 of the roller 105 at both sides of the roller 105.

Figure 11:
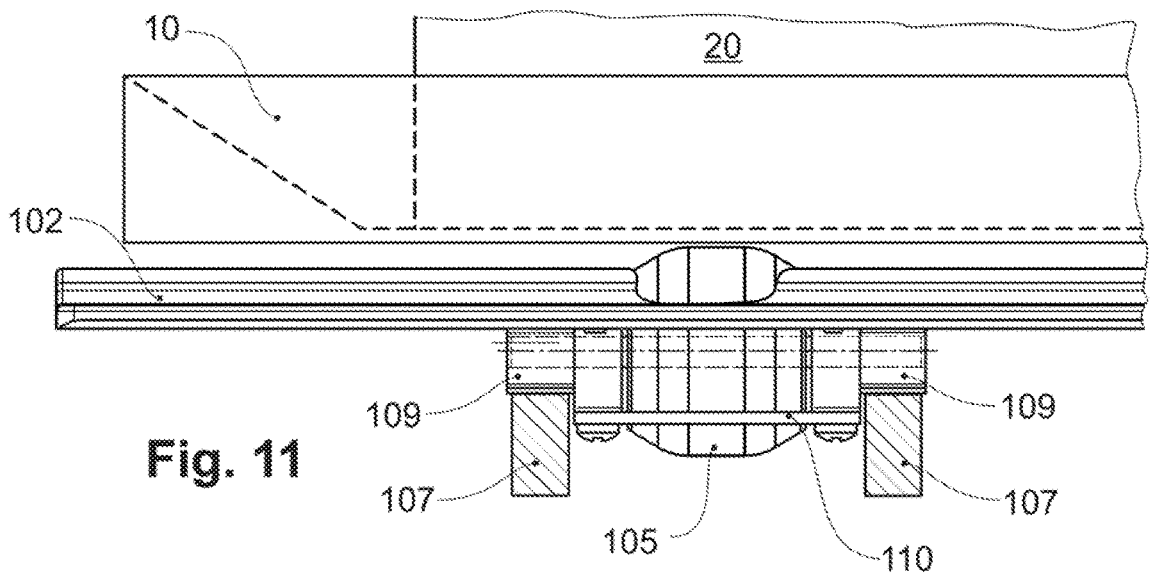
FIG. 11: a detail of a view of the conveying member of FIG. 9 from the front, with a roller in the freewheel position.

A detail of a view of the conveying member element 101 from the front is represented in FIG. 11, wherein a roller 105 is situated in the freewheel position. The conveyed item 20, which is arranged in a conveying tray 10 that lies on the running surface of a roller 105, is also represented in FIG. 11. The conveying tray 10 is conveyed by way of contact with the rollers 105.

The freewheel position of the roller 105 in FIG. 11 is achieved by way of the two actuating means 107, which are designed as separate cams supporting the pivot holders 109 of the roller 105 from below and pressing these upwardly onto the upper stop. The pivot holders 109 therefore lie on the actuating means 7 and by way of this are pressed upwards against the conveying element 102, which for this has formed upper stops. In this position, the roller 105 in FIG. 11 is situated in the freewheel position, thus can freely rotate.

The conveying trays 10 can therefore be moved relative to the conveying member 101 with a low force effort via the rollers 105, which are in the freewheel position and act as linear bearings of the conveying member 101. The conveying member 101, for example, can be moved below the conveying trays 10 with the conveyed item 20, without a large force being applied upon the conveying trays 20. In other words, a transmission of a movement energy of the conveying member 101 onto the conveying trays 10 is negligible given rollers 5 in the freewheel position.

Accordingly, the rollers 105 of the conveying member 101 are held in a freewheel position along the accumulation stretches 2, 17, so that the conveying member 101 can be moved through below the conveying trays 10, without these applying a noticeable driving force upon the accumulated conveying trays 10. High friction forces between the conveying member 101 and the accumulated conveying trays 10 are prevented by way of this.

Figure 12:
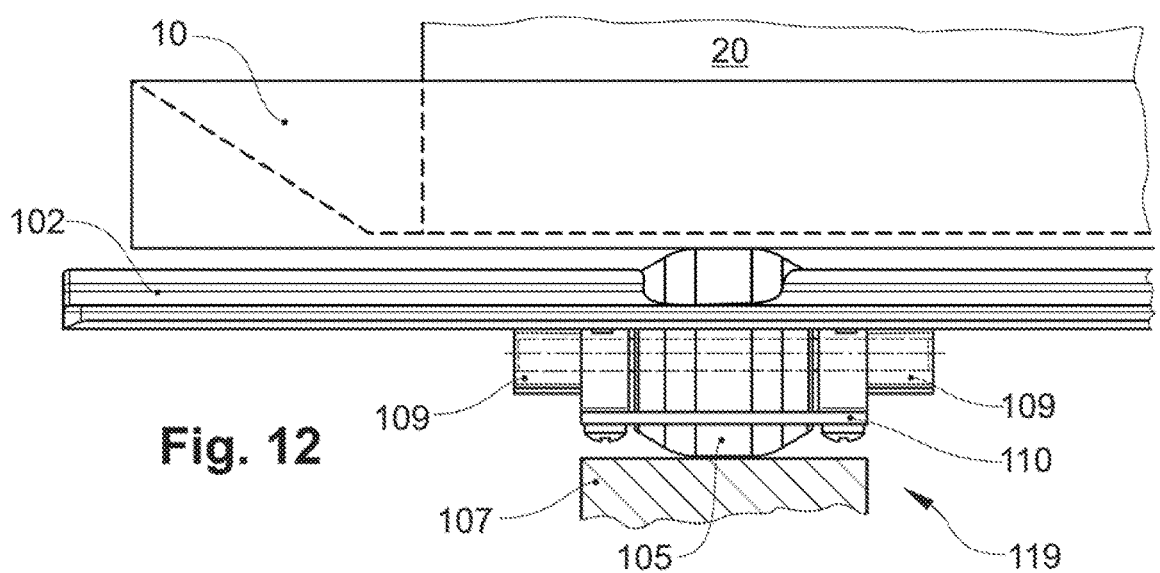
FIG. 12: a detail analogous to FIG. 11, with the roller in drive position.

A detail is represented in FIG. 12 analogously to FIG. 11, but with the roller 105 in the drive position. In contrast to FIG. 11, FIG. 12 includes a roll guide. The roll guide 117 although likewise being designed as a cam, however this cam on its side that is directed to the top includes a roll surface, on which the running surface of the roller 105 lies from above. The roll guide 117 therefore supports the roller 105 from below and by way of this drives the roller 105, which together with the conveying member 101 is moved beyond the roll guide 117.

The roll surface is plane and is aligned parallel to the main surface 108. The roll guide 117 thereby engages on the roller 105 at the point that is furthest from the roller pivot 106, just as the conveying trays 10 on the opposite side of the roller 105. The transmission ratio of the drive is therefore 1, which means that the speed between the roll guide 117 and the conveying member 101 is as equally large as the speed between the conveying trays 10 and the conveying member 101. The conveying tray 10, driven by the roller 105, therefore moves twice as fast relative to the roll guide 117 than the conveying member 101.

The roll guide 117, as is shown in FIG. 12, can include a roll element 118, e.g., in the form of a circulating drive belt 118. The embodiments above therefore only relate to a non-driven roll guide.

In the case of a driven roll element 118, the rollers 105 can be driven at an arbitrary speed and be driven in the conveying direction of the conveying member 101 as well as counter to this, so that the conveying trays 10 that lie on the rollers 105 have a greater or lower speed compared to the conveying member 101 or can even be conveyed in a conveying direction that is opposite to the conveying direction F of the conveying member 101.

Basically, the conveying trays 10 can be operated with an actively driven roll guide 117 at a conveying speed that is independent of the speed of the conveying member 101.

Together, the roll guide 117, the roll element 118 and the roller 105 can be considered as an acceleration device 119.

The roll guide 117 is applied along the acceleration stretch sections 4 of the feed conveyor 1, 1', along which acceleration stretch the conveying trays 10 are accelerated out of the accumulation stretch 2, as has already been described in detail above.

Concerning the present embodiment of the conveying member 101, the spatial position of the roller pivot 106 and therefore also of the roller 105 is identical in the freewheel position and the drive position, specifically with the pivot holders 109 bearing on the upper stop. However, the drive position can also lie further to the bottom than the freewheel position. The freewheel position in turn, in another embodiment and/or application can, however, also lie further to the bottom than the drive position. However, neither in the drive position nor in the freewheel position can the running surface of the roller 105 come into contact with the arresting appliance 110.

Figure 13:
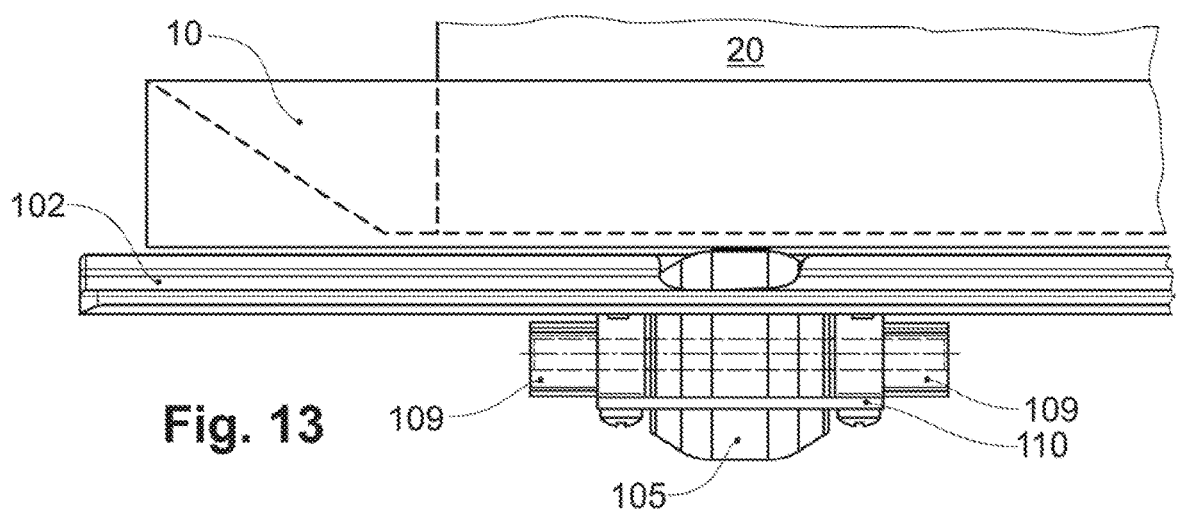
FIG. 13: a detail analogous to FIG. 11, with the roller in the arrested position.

FIG. 13 shows a detail analogously to FIG. 11. Herein, the roller 105 is in the arrested position. The arresting appliance 110 serves as a lower stop for the roller 105, by way of the running surface of the roller 105 being able to lie on this in the direction of gravitational force.

The arresting appliance 110 is designed as a metal plate which includes an opening. The shaping of this opening of the arresting appliance 110 and its dimensioning is such that the roller 105 can project into the opening and the running surface of the roller 105 can come into a contact fit with edges of the opening of the arresting appliance 110. If the roller 105 is in the arrested position, then the running surface of the roller 105 lies on the arresting appliance 110 in the direction of gravity and the roller 105 projects party through the opening of the arresting appliance 110. The arresting appliance 110 is fastened to the conveying element 102 in a rigid and stationary manner and as a lower stop limits the movement of the roller 105 and thus also of the roller pivot 106 in the direction of gravity. In the present case, the arresting appliance 110 is screwed on support, s which are formed by the conveying element 102, and is arranged parallel to the main surface 108.

The roller pivot 106 is designed as a metal pin, about which the roller 105 is mounted in a freely rotating manner. The roller pivot 106 projects out of the roller 105 at both sides of the roller 105, then runs through an elongate opening, which is formed by the conveying element 102 and which is designed as a linear sliding guide, and at both sides ends in a pivot holder 109. The roller pivot 106 is connected rigidly and thus in a rotationally fixed manner to the pivot holders 109. The linear sliding guide, which is formed by the conveying element 102, guides the roller pivot 6 orthogonally to the main surface 108. The conveying element 2 and the pivot holders 109 are manufactured of plastic.

The arresting appliance 110 thus serves as a lower stop for the roller 105, by way of the running surface of the roller 105 being able to lie thereon in the direction of gravity. The arresting appliance 110 acts upon the roller 105 in a self-arresting manner due to the weight of the roller and/or of the conveying trays 10 or of the conveyed item 20, which is conveyed in these. The roller pivot 106 can be moved in the direction of the main surface 108 by way of the linear sliding guide, wherein the conveying element 102 has formed an upper stop for this movement, on which stop the pivot holders 109 can come to abut. The conveying element 2 thus forms an upper stop for the pivot holders 109 and thus indirectly for the roller pivots 106 and the rollers 105, and the rollers 105 are situated in the freewheel position in this position. The rollers are in the arrested position when the rollers 105 lie on the arresting appliance 110 on the lower stop.

The pivot holders 109, the linear sliding guide for the roller pivot 106, formed by the conveying element 102, and the upper stops for the pivot holders 109, formed by the conveying element 102, are encompassed by the roller holder 104.

The rollers 105 have a crowned shape. The cross section of the rollers 105 (thus a section along the roller pivot 106) therefore has a convex shape, wherein the running surface of the rollers 105 is somewhat flattened. The running surfaces of the rollers 105 are rubberised, and the rollers 105 themselves consist of plastic.

In FIG. 13, the roller 105 now lies on the arresting appliance 110 and is in the arrested position. The arrested position is the position of the roller 105 that lies furthest to the bottom. The roller 105 is pressed into the arresting appliance 10 by way of the weight of the roller 5 and of the conveyed object 20 and this appliance thus functions in a self-arresting manner.

If therefore no actuating means or roll guides act upon the roller mechanism 103, then the rollers 105 are located in the arrested position, particularly if these are loaded by a conveying tray 10. Since the rollers 105 in particular include a running surface with a high coefficient of friction, these rollers in the arrested position act as catches for the conveying trays 10.

Consequently, the rollers 105 are in the arrested position along conveying stretch sections, in which the conveying trays 10 are to be conveyed at the speed of the conveying member 101. This is the case, for example, along the loading stretch 9.

FIG. 14 shows a perspective view from above onto a detail of a feed conveyor 1, 1', which includes a conveying member 101 according to the invention. The conveying member 101 includes a plurality of subassemblies each with an extensive conveying element 102 and roller mechanisms 103, which are attached thereon and which have rollers 105. The conveying member 101 further includes a drive chain 112, on which the subassemblies are fastened via the conveying elements 102. For this, the conveying elements 102 are each rigidly fastened to an individual link of the drive chain 112. The drive chain 112 is led through a chain channel 113, which partly surrounds the drive chain 112 and encompasses it in a c-shaped manner. Since the rollers 105 in particular include a running surface with a high coefficient of friction, these in the arrested position act as drivers for the conveying trays 10.

A view from the front onto a section of the feed conveyor 1, 1' of FIG. 14 is represented in FIG. 15. In FIG. 15, the rollers 105 are represented in the drive position, wherein a roll guide, along which the rollers 105 roll, is positioned below the rollers 105.

FIGS. 16 to 19 show four different transfer situations as occur in the transfer region 5 of a conveying system 31 according to the FIGS. 4 to 7 and as are solved by way of the method according to the invention.

The arrangement according to FIGS. 16 to 19 shows the conveying track of a tilt-tray sorter 61 with tilt-trays 62, which are arranged along this at regular distances, directly in front of the transfer region. The conveying tracks of two feed conveyors 1, 1' with conveying containers 10, which are arranged along the feed conveyor tracks and which are occupied by conveyed items 20, run on both sides of the tilt-tray conveying track and parallel to this. The tilt-trays 61 as well as the conveying trays 10 are moved along a common conveying direction F.

The transfer situation according to FIG. 16 represents the regular operation, i.e. the regular transfer operation. Given a regular transfer operation, on the one hand all conveying trays 10 of the feed conveyors 1, 1' which are moved into the transfer region 4 are occupied by a conveyed item 20 which is to be transferred. Furthermore, all tilt-trays 62 that are moved into the transfer region 4 are capable of receiving a conveyed item 20 that is to be transferred.

As already explained above, conveying trays 10 of the two feed conveyors 1, 1' are conveyed into the transfer region on both sides of the conveying track of the tilt-tray sorter 61.

The conveying trays 10 of a first feed conveyor 1 are accelerated along the acceleration stretch section 4, wherein the conveying trays 10 of the first feed conveyor 1 are brought into a cyclically synchronous conveying with each second tilt-tray 62 of the tilt-tray sorter 61 and form a transfer pairing with these. A transfer pairing means that the tilt-tray 62 and the conveying container 10 are arranged side by side considered in the conveying direction F.

The conveying trays 10 of the second feed conveyor 1' are likewise accelerated along the acceleration stretch section 4, wherein the conveying trays 10 of the second feed conveyor 1' are brought into a cyclically synchronous conveying with every second tilt-tray 62 of the tilt-tray sorter 61 which is shifted by one, and form a transfer pairing with these.

In this manner, the tilt-trays 62 of the tilt-tray sorter 61 in an alternating manner to both sides are paired with the conveying trays 10 of a feed conveyor 1, 1' in a cyclically synchronous manner and are led next to one another in pairs.

This means that given an arrangement of tilt-trays 62 A-B-A-B-A-B along the conveying track upstream of the transfer region, the tilt-trays 62 which are characterised by "A" are paired with conveying trays 10 of the first feed conveyor 1' and the tilt-trays 62 characterised by "B" with conveying trays 10 of the second feed conveyor 1', and are led next to one another in pairs.

By way of inclining the conveying trays 10 along the inclining mechanism 6 in the transfer region 5, the conveyed items 20 are transferred onto the tilt-trays 62 which form a transfer pairing with the delivering conveying trays 10.

FIG. 17 shows a second transfer situation which represents a first transfer special case which no longer belongs to regular operation.

A conveying tray 10 of a feed conveyor 1 which is moved to the transfer region includes a conveyed item 20' that is not to be transferred to the tilt-tray sorter 61 but, in contrast, is to be led back. This can be the case, e.g., if the identification information on the mentioned conveyed item 20', such information being necessary for the sorting, could not be read out and the affected conveyed item 20' is not therefore ready for sorting.

The affected conveying container 10 according to the conveying system 31 according to FIGS. 4 to 7 would accordingly be transferred through the transfer region on the conveying member 101 without being brought into inclination. The procedure has already been described further above in the context of the diverter 8 of the transfer device.

A processing of this transfer special case according to the regular operation described above would mean that the tilt-tray 62', which is paired with the mentioned conveying tray 10, would receive no conveyed item 20 in the transfer region and would remain empty. However, conveying capacities would unnecessarily be left unused on account of this.

In order to avoid a conveying gap that arises due to this, the conveying containers 10 of the two feed conveyors 1, 1', which in the conveying direction F are subsequent to the affected tilt-tray 62, are repositioned to the front by one tilt-tray position 22 on both sides of the tilt-tray conveying track.

The repositioning is effected along the acceleration stretch section 4, in particular subsequently to an accumulation stretch 2. The conveying containers 10 are conveyed along the acceleration stretch section 4 at a variable speed, which is independent of the conveying speed of the conveying member 101 and can therefore be arbitrarily accelerated or delayed. The conveying speed along the acceleration stretch section is set by the control device 21.

Concerning this procedure, the oppositely lying conveying tray 10, which initially forms a transfer pairing with the subsequent tilt-tray 62, assumes a transfer pairing with the tilt-tray 62' that is affected by the conveying gap.

The subsequent conveying trays on both sides of the tilt-tray conveying track are each repositioned to the front in the conveying direction by one tilt-tray position along the acceleration stretch section 4.

Since the conveying trays 10 of the feed conveyors 1, 1' are repositioned to the front by one tilt-tray position on both sides of the tilt-tray conveying track, the repositioning path of a conveying tray 10 merely extends over one tilt-tray position.

If the conveying trays 10 of the affected feed conveyor 1 were to be advanced, i.e., repositioned to the front, on only one side of the tilt-tray conveying track, then due to the delivery on alternating sides these would need to be advanced or repositioned to the front by in total two tilt-tray positions, thus by double the repositioning path. However, this would place significantly higher demands on the feed conveyor 1 and would render necessary a longer acceleration stretch section 4.

FIG. 18 shows a third transfer situation which represents a second transfer special case, which likewise does not belong to the regular operation. This differs from the second transfer special case according to FIG. 17 in that the affected conveying tray 10 includes no transport item 20 at all instead of a transport item 20' that is not to be transferred.

This means that in the second transfer special case too, it is the case of a conveying container 10, from which no transport item 20 is transferred onto the tilt-tray sorter 61 and which accordingly produces a conveying gap.

Accordingly, the same methods steps are carried out in the second transfer special case as in the first transfer special case according to FIG. 17.

FIG. 19 shows a fourth transfer situation, which in turn represents a third transfer special case that no longer falls under regular operation. This differs from the first and the second transfer special case according to FIGS. 17 and 18 in that in this case a tilt-tray 62' cannot take over a conveyed item 20 whilst the conveying containers 10 of the two feed conveyors 1, 1' are each loaded with conveyed items 20 that are to be transferred.

Were this transfer special case to now be processed according to the regular operation, which is described by way of FIG. 16, then the conveying tray 10, which is assigned to the tilt-tray 62' that is not ready to receive would have to be conveyed through the transfer region without a transfer of the conveyed item 20 and the non-transferred conveyed item 20 would have to be led back. However, due to this, conveyed items 20, which should really be transferred onto the tilt-tray sorter 61, would be unnecessarily led back.

In order to avoid this, the conveying containers 10 of the two feed conveyors 1, 1', which, in the conveying direction F, are subsequent to the tilt-tray 62' that is not ready to receive are each repositioned back by one tilt-tray position 23 on both sides of the tilt-tray conveying track.

The repositioning is effected along the acceleration stretch section 4, in particular subsequently to an accumulation stretch 2. The conveying containers 10 are conveyed along the acceleration stretch section 4 at a variable speed, which is independent of the conveying speed of the conveying member 101 and can hence be arbitrarily accelerated or braked. The conveying speed along the acceleration stretch section is set by the control device 21.

Concerning this procedure, the conveying tray 10, which initially forms a transfer pairing with the tilt-tray 62' that is not ready to receive assumes a transfer pairing with the tilt-tray 62 that is subsequent next of all in the conveying direction F.

The subsequent conveying trays 10 considered in the conveying direction F each move back by one tilt-tray position on both sides of the tilt-tray conveying track.

Since the conveying trays 10 of the feed conveyor 1, 1' considered in the conveying direction F are repositioned back by one tilt-tray position on both sides of the tilt-tray conveying track, the extent of the repositioning path of a conveying tray 10 is merely one tilt-tray position.

If the conveying trays 10 of the affected feed conveyor 1, which form the transfer pairing with the tilt-tray 62' that is not ready for receiving were to be repositioned back on only one side of the tilt-tray conveying track, then these would have to be repositioned back by in total two tilt-tray positions, thus double the repositioning path, on account of the delivery on alternating sides. However, this would place significantly greater demands on the feed conveyor 1 and, for example, render necessary a longer acceleration stretch section 4.

The invention claimed is:

1. A method for transferring conveyed items from one or more feed conveyors onto an outgoing conveyor, in a transfer region, wherein:
   the feed conveyors in each case comprise a conveying member, which is driven along a feed conveying stretch for conveying conveyed items into the transfer region,
   the feed conveyers in each case comprise conveying containers which lie on the conveying member in a connection-free manner and in which the conveyed items are conveyed into the transfer region, and in the transfer region, both feed conveying stretches of the feed conveyors run in a conveying direction along both sides of a transfer conveying stretch of the outgoing conveyor,
   the outgoing conveyor comprises conveying containers, which are movable along the transfer conveying stretch for taking over the conveyed items which are delivered by the feed conveyors;
   the conveyed items are transferred into the conveying containers of the outgoing conveyor in an alternating manner from said both sides;
   the conveying containers of the feed conveyors that contain the conveyed items and that lie on the conveying member, are accelerated relative to the conveying member along the feed conveying stretch towards the transfer region via an acceleration device and, for the purpose of delivery of the conveyed items, are brought into a cyclically synchronous side-by-side conveying with the conveying containers of the outgoing conveyor; and
   at least one of the following apply:
      a) given a presence of a conveying container of the feed conveyors that is not ready for transfer and from which no conveyed item can or is to be transferred, conveying containers of the feed conveyor that, in the conveying direction, are subsequent to the conveying container that is not ready for transfer, are repositioned by way of the acceleration device to a front in the conveying direction by one conveying container position of the outgoing conveyor on both feed conveying stretches,
      b) given a presence of a conveying container of the outgoing conveyor that is not ready for transfer and into which no conveyed item can be transferred, a conveying container of the feed conveyors that forms a transfer pairing with the conveying container of the outgoing conveyor that is not ready for transfer, as well as conveying containers of the feed conveyors on both feed conveying stretches that, in the conveying direction, are subsequent to the conveying container of the feed conveyors that forms the transfer pairing, are repositioned back by way of the acceleration device by one conveying container position of the outgoing conveyor.

2. The method according to claim 1, wherein both feed conveying stretches of the feed conveyors and the transfer conveying stretch of the outgoing conveyor run parallel next to one another in the transfer region.

3. The method according to claim 1, wherein in regular operation, every second conveying container of the outgoing conveyor is loaded with a conveyed item from a first side, and every second conveying container of the outgoing conveyor, which shifted by one, is loaded with a conveyed item from a second side.

4. The method according to claim 1, wherein the conveying containers of the outgoing conveyor are conveyed through the transfer region in a manner in which they are uniformly spaced from one another.

5. The method according to claim 1, wherein the conveying member of the feed conveyors forms a sheet-like main surface, which faces the conveyed items and defines the feed conveying stretch, and the conveying member of the feed conveyors comprises at least one conveying element, which forms at least a part of the main surface.

6. The method according to claim 5, wherein the conveying member comprises rollers, which via a roller holder are mounted in a rotatable manner about roller pivots on the at least one conveying element, wherein the rollers project at least partly beyond the main surface of the conveying member, so that the conveying containers of the feed conveyors lie on the rollers.

7. The method according to claim 6, wherein the rollers in a drive position are driven along the feed conveying stretch via the acceleration device for accelerating the conveyed items or the conveying containers of the feed conveyors relative to the conveying member.

8. The method according to claim 5, wherein the conveying member comprises rollers, which via a roller holder are rotatably mounted about roller pivots on the at least one conveying element and which can selectively assume the state of a freewheel position, an arrested position, or a drive position, wherein the rollers project at least partly beyond the main surface of the conveying member, so that the conveying containers of the feed conveyors lie on the rollers.

9. The method according to claim 8, wherein the roller holder and the rollers are part of a roller mechanism, wherein the different states of the rollers are caused by active elements which act upon the roller mechanism.

10. The method according to claim 9, wherein the rollers are each movable between at least two spatially different positions by way of the active elements, in which positions the rollers assume different states from the group of states comprising the arrested position, the freewheel position, and the drive position.

11. The method according to claim 10, wherein the rollers are each movable with a movement component perpendicular to the main surface between at least two positions by way of the active elements.

12. The method according to claim 6, wherein the rollers are rotatably mounted in the roller holder about a physical roller pivot.

13. The method according to claim 1, wherein the conveying containers of the feed conveyors with the conveyed items are buffered along an accumulation stretch upstream of the transfer region considered in the conveying direction and are released individually out of the accumulation stretch towards the transfer region via a release device.

14. The method according to claim 6, wherein the acceleration device comprises a roll guide, and the rollers roll along the roll guide in the feed conveying stretch.

15. The method according to claim 6, wherein the conveying containers of the feed conveyors along the feed conveying stretch are brought via the rollers to a speed which differs from a conveying speed of the conveying member.

16. The method according to claim 14, wherein the roll guide comprises a roll element, which is actively drivable counter to the conveying direction via a drive that interacts with a control device, on which roll guide the rollers roll.

17. The method according to claim 12, wherein the feed conveyors in the transfer region comprise a transfer device with an inclining mechanism, by way of which the conveying containers of the feed conveyor, during their conveying along the feed conveying stretch, are inclined to a side considered in the conveying direction for the purpose of delivery of the conveyed items onto the conveying containers of the outgoing conveyor.

18. The method according to claim 17, wherein the inclining mechanism lifts the conveying containers at least partly from the conveying member.

19. The method according to claim 17, wherein the inclining mechanism comprises a conveying drive, by way of which the conveying containers of the feed conveyors are conveyed along the inclining mechanism in the conveying direction independently of the conveying member.

20. The method according to claim 17, wherein the transfer device comprises a diverter, which interacts with a control device and via which the conveying containers of the feed conveyors are selectively fed to the inclining mechanism or are conveyed further on the conveying member.

21. An appliance for carrying out the method according to claim 1, the appliance comprising:
the feed conveyors;
the outgoing conveyor;
the acceleration device; and
a control device;
wherein:
the feed conveyors each include a conveying member, which is driven along the feed conveying stretch for conveying the conveyed items into the transfer region, and the conveying containers, which lie on the conveying member in a connection-free manner and in which the conveyed items are conveyed into the transfer region;
in the transfer region, both feed conveying stretches of the feed conveyors run in a conveying direction along both sides of the transfer conveying stretch of the outgoing conveyor;
the outgoing conveyor comprises the conveying containers, which are movable along the transfer conveying stretch for taking over the conveyed items, which are delivered in an alternating manner from said both sides by the feed conveyors;
the acceleration device is designed to accelerate the conveying containers of the feed conveyor that contain the conveyed items and that lie on the conveying member, so as to move the conveying containers in a direction along the feed conveying stretch towards the transfer region and relative to the conveying member, so as to bring the conveying containers into a cyclically synchronous side-by-side conveying with the conveying containers of the outgoing conveyor; and
the control device controls the acceleration or the speed of the conveying containers along an acceleration stretch section.

22. The appliance according to claim 21, wherein the feed conveyors in the transfer region comprises a transfer device with an inclining mechanism, by way of which the conveying containers of the feed conveyor, during their conveying along the feed conveying stretch and considered in the conveying direction, are inclinable to a side onto the conveying containers of the outgoing conveyor.

23. The appliance according to claim 22, wherein the inclining mechanism is designed to at least partly lift the conveying containers from the conveying member.

24. The appliance according to claim 22, wherein the inclining mechanism comprises a conveying drive, by way of which the conveying containers of the feed conveyors can be conveyed along the inclining mechanism in the conveying direction independently of the conveying member.

25. The appliance according to claim 21, wherein the feed conveyors upstream of the transfer region in the conveying direction form an accumulation stretch for buffering the conveyed items or the conveying containers.

26. The appliance according to claim 21, wherein the feed conveyors are supply conveyors for supplying the conveyed items onto the outgoing conveyor.

27. The appliance according to claim 21, wherein the outgoing conveyor is a sorter.

* * * * *